United States Patent
Emura et al.

(10) Patent No.: US 7,797,330 B2
(45) Date of Patent: Sep. 14, 2010

(54) IMAGE FORMATION DEVICE AND IMAGE FORMATION METHOD

(75) Inventors: Koichi Emura, Kanagawa (JP); Toshiyuki Tanaka, Tokyo (JP); Yuji Okada, Osaka (JP); Katsunao Takahashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 439 days.

(21) Appl. No.: 10/597,464

(22) PCT Filed: Jan. 26, 2005

(86) PCT No.: PCT/JP2005/000989

§ 371 (c)(1),
(2), (4) Date: Oct. 11, 2006

(87) PCT Pub. No.: WO2005/071616

PCT Pub. Date: Aug. 4, 2005

(65) Prior Publication Data

US 2008/0228713 A1 Sep. 18, 2008

(30) Foreign Application Priority Data

| Jan. 27, 2004 | (JP) | ............................ 2004/018839 |
| Feb. 5, 2004 | (JP) | ............................ 2004/029599 |
| Jan. 25, 2005 | (JP) | ............................ 2005/017468 |

(51) Int. Cl.
*G06F 17/30* (2006.01)
(52) U.S. Cl. .................................................... 707/763
(58) Field of Classification Search ................ 707/100, 707/1, 763
See application file for complete search history.

(56) References Cited

U.S. PATENT DOCUMENTS

| 5,890,137 | A | 3/1999 | Koreeda |
| 6,654,031 | B1 * | 11/2003 | Ito et al. ...................... 715/723 |
| 6,721,706 | B1 * | 4/2004 | Strubbe et al. .............. 704/275 |
| 2002/0016707 | A1 * | 2/2002 | Devoino et al. ............... 703/22 |

FOREIGN PATENT DOCUMENTS

| EP | 0779587 | 6/1997 |
| JP | 4-264972 | 9/1992 |

(Continued)

OTHER PUBLICATIONS

English Language Abstract of JP 2001-307137.

(Continued)

*Primary Examiner*—James Trujillo
*Assistant Examiner*—Amresh Singh
(74) *Attorney, Agent, or Firm*—Greenblum & Bernstein, P.L.C.

(57) ABSTRACT

The present invention is provided with a text string/material correspondence table in which material data for creating computer graphics is associated with a set of the material names of material data, and a hierarchical structural description which describes a feature of material data in a hierarchical structure. Material data corresponding to the feature is searched using the hierarchical structural description when a feature is input, searched material data is stored, and searched material data and the material name of material data are registered with the text string/material correspondence table. Material data corresponding to the material name is acquired using the text string/material correspondence table when a material name is input, and computer graphics are created using acquired material data.

15 Claims, 31 Drawing Sheets

FOREIGN PATENT DOCUMENTS

| | | |
|---|---|---|
| JP | 8-263681 | 10/1996 |
| JP | 9-167165 | 6/1997 |
| JP | 9-167251 | 6/1997 |
| JP | 2000-331182 | 11/2000 |
| JP | 2001-125894 | 5/2001 |
| JP | 2001-243221 | 9/2001 |
| JP | 2001-307137 | 11/2001 |
| JP | 2002-108875 | 4/2002 |

OTHER PUBLICATIONS

English Language Abstract of JP 2001-125894.

* cited by examiner

```
;BAC
;' ;' is commnet.
(Head
    (bacVersion    6)
)
(Figure
(Textures
    (i2   256   256)
)
(Colors
    (f3   0.78431   0.78431   0.78431)
)
(Vertices
    (coords
        (pnt 92.545    − 0.15637    76.428)
            :
        (pnt 0    655.76    69.876)
    ); coords
    (normals
        (vct 0.64365    − 0.76197    0.071529)
            :
        (vct − 1.7037e − 010    − 0.028882    0.99958)
    ); normals
); Vertices.
(Bones
        :
    (bone
        (name "Body")                                      ⎫
        (hasChild true)                                    ⎪
        (hasBrother    true)                               ⎬ 201
        (translate 2.3916e − 010 262.65 0.0097923)         ⎪
        (rotate    3.5355e − 006  − 737.35 0.1203)         ⎪
        (handle    0.000234 262.54  − 999.99)              ⎭
        (vertexIndices
            11  32  34  201  330  401  422  424  591  720  801  823
        )
    )
        :
    (bone
        (name "Head")
            :
    )
        :
    (bone
        (name "Shold_L")
            :
    )
    (bone
        (name "Arm_L_U1")
            :
    )
        :(CONTINUED)
```

```
(CONTINUED)
        (bone
              (name "Shold_R")
                    :
        )
        (bone
              (name "Arm_R_U1")
                    :
        )
              :
        (bone
              (name "Leg_L_U")
                    :
        )
              :
        (bone
              (name "Leg_R_U")
                    :
        )
              :
) ; Bone
(Materials
        (material
              (name              "Bone")
              (blendMode normal)
              (transparent       false)
              (doubleFace        false)
              (lighting true)
              (colorIndex     0)
              (textureIndex         -1)
              (alpha          1)
              (specular       0)
              (shininess          0.4)
        )
        (material
              (name              "Map")
                    :
        )
) ; Materials
(TextureCoords
        (f2    0.9861        0.030066)
              :
        (f2    0.58552       0.34639)
) ; TextureCoords
(Polygons
        (face 1 (i3 335 838 839) (i3 0 1 2))
              :
        (face 1 (i3 917 971 920) (i3 5097 5098 5099))
) ; Polygons
(DynamicPolygons
) ; DynamicPolygons
) ; end of figure
```

```
;TRA
( Head
    ( traVersion 4.0 )
)
( Figure
( name "" )
( totalFrame 211 )
:
( bone
( name "Leg_L_U" )
( translate.x
    ( kf  0    0 )
)
( translate.y )
    ( kf  0    0 )
)
( translate.z )
    ( kf  0    0 )
)                        } 401a
( scale.x
    ( kf  0    100 )
)
( scale.y
    ( kf  0    100 )
)                        } 402a
( scale.z
    ( kf  0    100 )
)
( rotate.x
    ( kf  0    0 )
    ( kf  3    0 )
    ( kf  6    0.029054 )
    :
    ( kf  210  0.053164 )
)
( rotate.y )
    ( kf  0    0 )
    ( kf  3    0 )
    ( kf  6    -0.45613 )
    :
    ( kf  210  0.19752 )  } 403a
)
( rotate.z
    ( kf  0    1 )
    ( kf  3    1 )
    ( kf  6    0.88944 )
    :
    ( kf  210  0.97886 )
)
( roll
    ( kf  0    6 )
    ( kf  9    5.7103 )
    :
    ( kf  210  7.0669 )   } 404a
)
    : (CONTINUED)
```

```
(CONTINUED 1)
( bone
( name "Body" )
( translate.x
    ( kf  0    0 )
)
( translate.y )
    ( kf  0    0 )       } 401b
)
( translate.z )
    ( kf  0    0 )
)
( scale.x
    ( kf  0    100 )
)
( scale.y
    ( kf  0    100 )     } 402b
)
( scale.z
    ( kf  0    100 )
)
( rotate.x
    ( kf  0    0 )
    ( kf  3    0 )
    :
    ( kf  8    0.012169 )
)
( rotate.y )
    ( kf  0    0 )
    ( kf  3    0 )       } 403b
    :
    ( kf  8    0.22292 )
)
( rotate.z
    ( kf  0    1 )
    ( kf  3    1 )
    :
    ( kf  8    0.97476 )
)
( roll
    ( kf  0    -0.027976 ) } 404b
)
)
    : (CONTINUED 2)
```

```
(CONTINUED 2)
( bone
( name "Arm_L_U1" )
( translate.x
    ( kf  0    0 )
)
( translate.y )
    ( kf  0    0 )       } 401c
)
( translate.z )
    ( kf  0    0 )
)
( scale.x
    ( kf  0    100 )
)
( scale.y
    ( kf  0    100 )     } 402c
)
( scale.z
    ( kf  0    100 )
)
( rotate.x
    ( kf  0    0.82806 )
    ( kf  3    0.82806 )
    ( kf  6    0.75409 )
    :
    ( kf  210  0.78932 )
)
( rotate.y )
    ( kf  0    0 )
    ( kf  3    0 )
    ( kf  6    0.41313 )  } 403c
    :
    ( kf  210  -0.30231 )
)
( rotate.z
    ( kf  0    0.56064 )
    ( kf  3    0.56064 )
    ( kf  6    0.51055 )
    :
    ( kf  210  0.5344 )
)
( roll
    ( kf  0    0 )
    ( kf  3    0 )
    ( kf  7    16.503 )   } 404c
    :
    ( kf  210  -9.3896 )
)
)
    : (CONTINUED 3)
```

```
(CONTINUED 3)
( bone
( name "Arm_L_U2" )
  ( translate.x
    ( kf  0   0 )
  )
  ( translate.y )
    ( kf  0   0 )
  )                    }401d
  ( translate.z )
    ( kf  0   0 )
  )
  ( scale.x
    ( kf  0   100 )
  )
  ( scale.y
    ( kf  0   100 )   }402d
  )
  ( scale.z
    ( kf  0   100 )
  )
  ( rotate.x
    ( kf  0   0.17021 )
  )
  ( rotate.y )
    ( kf  0   0 )     }403d
  )
  ( rotate.z
    ( kf  0   0.98541 )
  )
  ( roll
    ( kf  0   0 )     }404d
  )
)
  : (CONTINUED 4)
```

```
(CONTINUED 4)
( bone
( name "Arm_R_U1" )
  ( translate.x
    ( kf  0   0 )
  )
  ( translate.y )
    ( kf  0   0 )    }401e
  )
  ( translate.z )
    ( kf  0   0 )
  )
  ( scale.x
    ( kf  0   100 )
  )
  ( scale.y
    ( kf  0   100 )  }402e
  )
  ( scale.z
    ( kf  0   100 )
  )
  ( rotate.x
    ( kf  0   −0.81208 )
    ( kf  3   −0.81208 )
    ( kf  5   −0.73175 )
       :
    ( kf  210 −0.64373 )
  )
  ( rotate.y )
    ( kf  0   0 )
    ( kf  3   0 )
    ( kf  5   −0.43367 )}403e
       :
    ( kf  210 −0.60962 )
  )
  ( rotate.z
    ( kf  0   0.58354 )
    ( kf  3   0.58354 )
    ( kf  5   0.52581 )
       :
    ( kf  210 0.46257 )
  )
  ( roll
    ( kf  0   0 )
    ( kf  3   0 )
    ( kf  7   26.672 )  }404e
       :
    ( kf  210 19.785 )
  )
)
  : (CONTINUED 5)
```

```
(CONTINUED 5)
( bone
( name "Leg_R_U" )
  ( translate.x
    ( kf  0   0 )
  )
  ( translate.y )
    ( kf  0   0 )    }401f
  )
  ( translate.z )
    ( kf  0   0 )
  )
  ( scale.x
    ( kf  0   100 )
  )
  ( scale.y
    ( kf  0   100 )  }402f
  )
  ( scale.z
    ( kf  0   100 )
  )
  ( rotate.x
    ( kf  0   0 )
    ( kf  3   0 )
    ( kf  6   0 )
       :
    ( kf  210 0 )
  )
  ( rotate.y )
    ( kf  0   0 )
    ( kf  3   0 )
    ( kf  6   0.4505 )  }403f
       :
    ( kf  210 0.24665 )
  )
  ( rotate.z
    ( kf  0   1 )
    ( kf  3   1 )
    ( kf  5   0.89278 )
    ( kf  6   0.76407 )
       :
    ( kf  210 0.9691 )
  )
  ( roll
    ( kf  0   − 6 )    }404f
  )
)
  : end of Figure.
```

| SUBJECT NOUN TEXT STRING 601 | LINK INFORMATION TO CHARACTER DATA 602 | CHARACTER ADJECTIVE TEXT STRING 603 |
|---|---|---|
| Girl | LINK TO CHARACTER DATA 1-1 | little |
|  | LINK TO CHARACTER DATA 1-2 | .. |
| Man | LINK TO CHARACTER DATA 2-1 | .. |
|  | .. | broad-shouldered |
| .. | .. | .. |

| CHARACTER DATA NAME | VERB TEXT STRING | EXPRESSION NAME TEXT STRING | LINK INFORMATION TO ACTION DATA |
|---|---|---|---|
| | 702 | 703 _120_ | 704 |
| CHARACTER DATA 1-1 | sits on | happily | LINK TO ACTION DATA 1-1-1-1 |
| | | sadly | LINK TO ACTION DATA 1-1-1-2 |
| | .. | .. | .. |
| | goes close to | happily | LINK TO ACTION DATA 1-1-2-1 |
| | .. | .. | .. |
| | stands up | angrily | LINK TO ACTION DATA 1-1-3-1 |
| | .. | .. | .. |
| .. | .. | .. | .. |
| CHARACTER DATA 2-1 | closes to | happily | LINK TO ACTION DATA 2-1-1-1 |
| | .. | .. | .. |
| | says | happily | LINK TO ACTION DATA 2-1-2-1 |
| | | regretfully | .. |
| | .. | .. | .. |
| .. | .. | .. | .. |

| LOCATION NAME TEXT STRING | LINK INFORMATION TO SET DATA | OBJECT NAME | OBJECT ADJECTIVE TEXT STRING | OBJECT PARAMETER |
|---|---|---|---|---|
| Park | LINK TO SET DATA 1-1 | the bench | wooden | ·· |
| | | the slide | ·· | ·· |
| | LINK TO SET DATA 1-2 | the sandbox | small | ·· |
| | | the pool | ·· | ·· |
| School | LINK TO SET DATA 2-1 | ·· | 25m length | ·· |
| ·· | ·· | ·· | ·· | ·· |

| PHRASAL VERB |
| :---: |
| ⋮ |
| sit on + |
| stand* up |
| made* up + |
| run away |
| run away from + |

FIG. 9

```
<?xml version="1.0" encoding="UTF-8"?>
<SearchResults>                                                          1001
  <Item contentType="Character">                                         1002
    <Thumbnail href="http://foo/Character/ai/thumb.gif"/>                1003
    <MaterialInfo href="http://foo/Character/ai/aiModelInfo.xml"/>
    <Material href="http://foo/Character/ai/ai.model">                   1004
      <Feature type="Genre" value="Human"/>
      <Feature type="Sex" value="Female"/>
      <Feature type="Wear" value="Shirt"/>                               1005
      <Feature type="Shirt.Color" value="Blue"/>
      <Feature type="Age" value="Young"/>
    </Material>
    </Common>
      <Feature type="Published" value="2003-12-18"/>
      <Feature type="Author" value="Hoge"/>
    </Common>
  </Item>
  <Item>
  ..
  </Item>
</SearchResults>
```

```
<?xml version="1.0" encoding="UTF-8"?>
<Key name="Bit Rate" type="list">    1301
    <Term name="32Mbps~"/>
    <Term name="128Mbps~"/>     1302
    <Term name="256Mbps~"/>
</Key>
```

FIG.13

IMAGE FORMATION DEVICE AND IMAGE FORMATION METHOD

TECHNICAL FIELD

The present invention relates to an image creating apparatus for creating computer graphics from texts, and an image creating method.

BACKGROUND ART

Conventionally, a method in which texts such as online chat are input to thereby automatically create computer graphics corresponding to the texts is proposed (for example, see Patent-Document 1).

In this method, texts and action data (material data) are associated to each other to be stored, whereby when a text is input, the input text is analyzed and action data corresponding to the analyzed text is searched. Then, searched action data is carried out to create computer graphics corresponding to the text.

Patent Document 1, Japanese Patent Application Laid-Open No. 2001-307137

SUMMARY OF THE INVENTION

Problems to be Solved by the Invention

However, with the conventional method, a user cannot recognize what kind of material data for creating moving pictures can be used in the system. For this reason, when a user creates computer graphics, even if a scenario is input, material data corresponding to the input text may not be used and the computer graphics may not be created.

Hence, a user needs to switch a process of creating computer graphics from a scenario to a process of searching what kind of material data can be used, whereby available material data is searched.

However, the engine used for search of material data differs from the engine for creating computer graphics. Accordingly, it is necessary to execute the engine used for search of material data and thereafter search for material data, and re-execute the engine for creating computer graphics again, and switch the process of searching the material data to the process of creating computer graphics by using searched material data. For this reason, there may be a situation where during the search process, a user forgot the scenario which a user had conceived before searching, and when having moved to the process of creating computer graphics again, the user remembers the scenario which the user had conceived. Moreover, when the user has moved to the process of creating computer graphics, the user may even forget what searched material data was.

In this way, there is a problem in the conventional method in that the process of creating computer graphics cannot be carried out smoothly.

Moreover, searched material data is most likely to be frequently used data to the user. However, since searched material data is not managed conventionally, there is a problem of searching for same material data numerous times.

It is an object of the present invention to provide an image creating apparatus and an image creating method wherein the computer graphics creation process and material data search can be carried out through a series of operations and searched material data can be used readily thereafter.

Means for Solving the Problems

In the present invention, a text string/material correspondence table in which material data for creating computer graphics is associated with a set of material names of this material data, and a hierarchical structural description which describes the feature of the material data in a hierarchical structure are provided, wherein when a feature is input, material data corresponding to this feature is searched using a hierarchical structural description, searched material data is stored and searched material data as well as the material name of the material data are registered with the text string/material correspondence table, and when the material name is input, material data corresponding to the material name is acquired using the text string/material correspondence table, and the computer graphics are created using the acquired material data.

Advantageous Effects of the Invention

According to the present invention, it is possible to carry out a computer graphic creation process and a search of material data through a series of operations and to use searched material data readily thereafter.

BRIEF DESCRIPTION OF DRAWINGS

FIG. 2 is a first view showing a description example of character data according to this embodiment;

FIG. 3 is a second view showing the description example of character data according to this embodiment.

FIG. 4 is a first view showing a description example of action data according to this embodiment;

FIG. 5 is a second view showing the description example of action data according to this embodiment;

FIG. 6 is a configuration diagram of a text string/character correspondence table according to this embodiment;

FIG. 7 is a configuration diagram of a character/action correspondence table according to this embodiment;

FIG. 8 is a configuration diagram of a text string/set correspondence table according to this embodiment;

FIG. 9 is a configuration diagram of an action dictionary according to this embodiment;

FIG. 10 is a view showing a description example of the search result for metadata database according to this embodiment;

FIG. 13 is a second view showing the description example of the hierarchical structural description according to this embodiment;

BEST MODE FOR CARRYING OUT THE INVENTION

Figure 1:
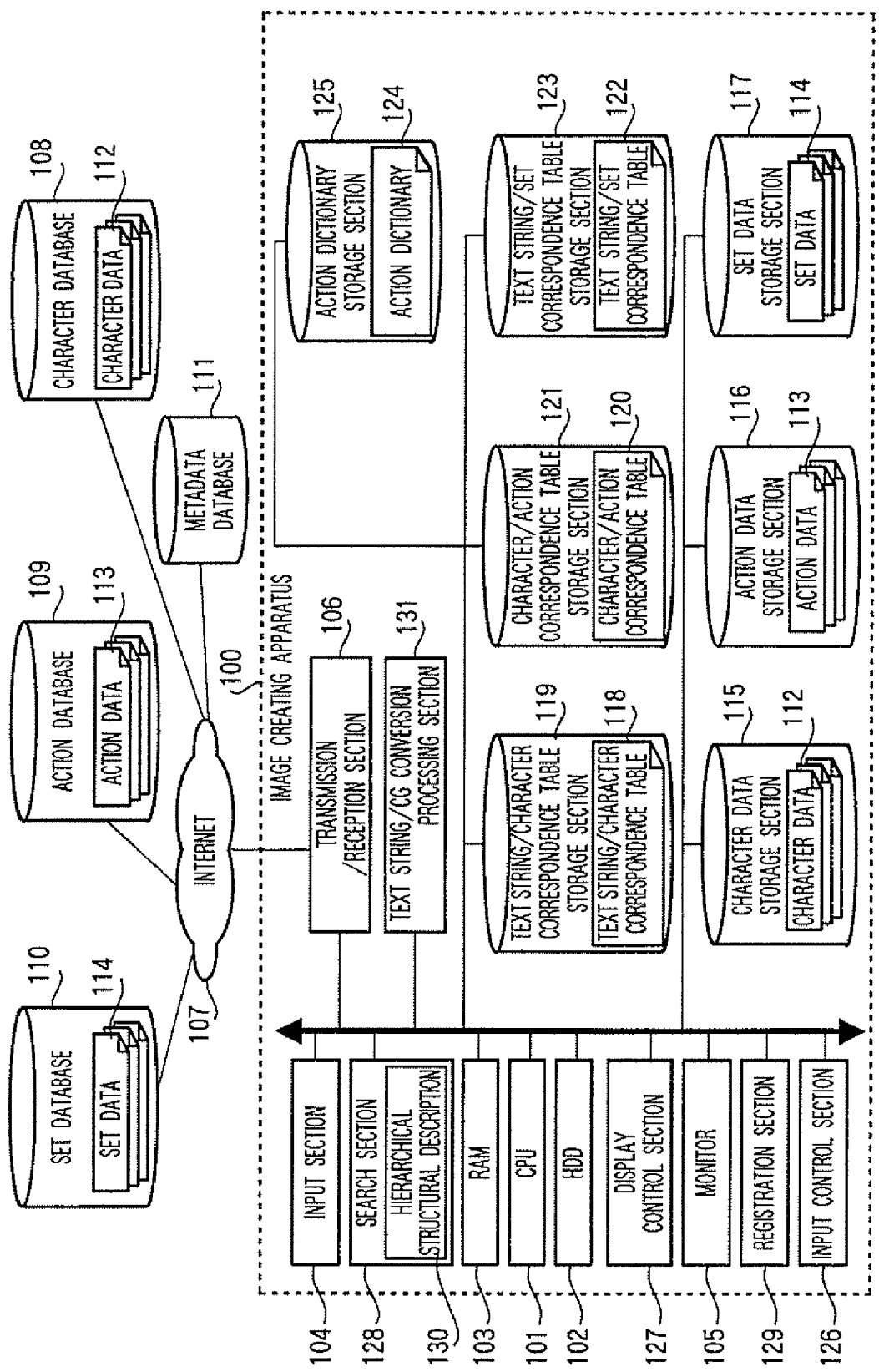
FIG. 1 is a configuration diagram of an image creating apparatus according to an embodiment of the present invention.

Hereinafter, a configuration of an image creating apparatus according to an embodiment of the present invention is described using FIG. 1. FIG. 1 is a configuration diagram of the image creating apparatus according to this embodiment.

An image creating apparatus 100 of this embodiment is provided with CPU 101 for controlling the entire system. CPU 101 loads and executes a program stored in HDD 102 into RAM 103 and thereby operates as a processing section having various functions.

Moreover, the image creating apparatus 100 is provided with input section 104, such as a keyboard and a mouse. Moreover, the image creating apparatus 100 is provided with a monitor 105 as a display means.

Moreover, the image creating apparatus 100 is provided with character data database 108 in which character data 112 which is animation data of computer graphics is stored, action database 109 in which action data 113 is stored, and a transmission/reception section 106 which receives character data, action data, and set data via Internet 107 from a set database 110 in which set data 114 is stored. Moreover, the transmission/reception section 106 also receives metadata from a metadata database 111.

Moreover, the image creating apparatus 100 is provided with a character data storage section 115 for storing a plurality of character data 112 acquired via Internet 107, an action data storage section 116 for storing a plurality of action data 113 acquired via Internet 107, and a set data storage section 117 for storing a plurality of set data 114 acquired via Internet 107.

Moreover, metadata explains character data 112, action data 113, and set data 114 which are material data. Specifically, in metadata, the features and thumbnail images of corresponding material data, link addresses to material data and the like are described. In addition, the details of metadata will be described later.

Character data 112 is a set of parameters, such as vertex coordinates of a character. Moreover, action data 113 is a set of parameters to make a character act as prescribed. The parameter includes a rotation matrix, a transfer matrix and the like. Set data 114 is a group of parameters of vertex coordinates and the like of set data which is the information of objects and the like that can interact with locations and characters. In addition, the details of character data 112, action data 113, and set data 114 will be described later.

Moreover, character data 112 is associated with a predetermined text string (subject noun text string). In this embodiment, a text string/character correspondence table 118, in which a text string and character data 112 are stored while being associated to each other, is stored in a text string/character correspondence table storage section 119 to thereby associate the text string with its corresponding character data 112.

In addition, the details of the text string/character correspondence table 118 will be described later.

Moreover, the image creating apparatus 100 is provided with a character/action correspondence table storage section 121 which stores a character/action correspondence table 120 for associating character data 112 with action data 113.

In addition, the details of the character/action correspondence table 121 will be described later.

Moreover, the image creating apparatus 100 is provided with a text string/set correspondence table storage section 123 which stores a text string/set correspondence table 122 for taking a correspondence among predetermined text strings (location name text string), set data 114, and the objects contained in set data 114.

In addition, the details of the text string/set correspondence table 122 will be described later.

Moreover, action data 113 includes an action which uses an object contained in set data 114, and an action which does not use it. Hence, the image creating apparatus 100 is provided with an action dictionary storage section 125 for storing an action dictionary 124 in which information as to whether or not verb data 113 uses an object is described.

In addition, the details of the action dictionary 124 will be described later.

Moreover, the image creating apparatus 100 is provided with an input control section 126. The input control section 126 extracts, from a scenario which is input to the input section 104, a location name text string to indicate a location, a subject noun text string to indicate a subject, and a verb text string to indicate an action, and sends them to a text string/CG conversion processing section 131.

The text string/CG conversion processing section 131 refers to the text string/character correspondence table 118, character/action correspondence table 120, text string/set correspondence table 122, and action dictionary 124, and selects character data 112, action data 113, and set data 114 corresponding to a text string sent from the input control section 126. Then, the text string/CG conversion processing section 131 sends selected character data 112, action data 113, and set data 114 to a display control section 127.

The display control section 127 creates computer graphics based on sent character data 112, action data 113 and set data 114, and displays them in a monitor 105.

Moreover, the image creating apparatus 100 is provided with a search section 128. The search section 128 acquires a plurality of metadata stored in the metadata database 111, extracts features from the plurality of acquired metadata, converts them into the hierarchical structural description 130 and manages. In addition, the details of the hierarchical structural description 130 will be described later.

Moreover, the search section 128 refers to the hierarchical structural description 130 to detect the feature with which the text string sent from the input control section 126 partially matches. Then, the search section 128 sends the detected feature to the display control section 127.

Moreover, the search section 128 sends to the registration section 129 the information related to character data 112, action data 113, and set data 114 corresponding to the feature selected from a list of the features sent from the input control section 126.

If there is no information on sent character data 112, action data 113, and set data 114 in the text string/character correspondence table 118, the character/action correspondence table 120, and the text string/set correspondence table 122, then the registration section 129 registers the information related to sent character data 112, action data 113, and set data 114 with the text string/character correspondence table 118, the character/action correspondence table 120, and the text string/set correspondence table 122.

The image creating apparatus 100 is configured as described above.

Next, character data 112 is described using FIG. 2 and FIG. 3. FIG. 2 and FIG. 3 are views showing a description example of character data 112. In addition, although in this embodiment, character data 112 is described in a BAC format (Ver. 6.0), the description example other than this may be possible.

Character data 112 includes coordinate values which express a basic attitude of a character as shown with the reference numeral 201 in the figure, and the type of a method of displaying the character as shown with the reference numeral 202 in the figure, textures to be used for the character as shown with the reference numeral 203 in the figure, and polygons to be used for the character as shown with the reference numeral 204 in the figure.

In addition, the description method of set data 114 is also the same as the description method of character data 112, and the detailed description thereof is omitted.

Next, action data 113 is described using FIG. 4 and FIG. 5. FIG. 4 and FIG. 5 are views showing a description example of action data 113. In addition, although in this embodiment, action data 113 is described in a TRA format (Ver. 4.0), description example other than this may be possible.

In action data 113, a move to each coordinate direction as shown with the reference numerals 401*a* to 401*f* in the figure, a scaling to each coordinate direction as shown with the reference numerals 402*a* to 402*f* in the figure, a vector to each direction as shown with the reference numerals 403*a* to 403*f* in the figure, and a rotation angle of the center as shown with 404*a* to 404*f* in the views are described.

Next, the text string/character correspondence table 118 is described in detail using FIG. 6. FIG. 6 is a configuration diagram of the text string/character correspondence table 118.

The text string/character correspondence table 118 is a table having a plurality of sets of a subject noun text string 601 which is the name of character data 112, a link information 602 to character data 112 corresponding to the subject noun text string 601, and a character adjective text string 603 for expressing the feature of character data 112.

Moreover, in the text string/character correspondence table 118, the link information 602 to a plurality of character data 112 are associated with one subject noun text string 601. That is, the text string/character correspondence table 118 has at least one or more character data 112 for one subject noun text string 601.

Accordingly, the text string/CG conversion processing section 131 can readily detect whether there is the subject noun text string 601 corresponding to the text string, which is input from the input section 104, by referring to the text string/character correspondence table 118, and can send a list of the subject noun text strings 601 to the display control section 127. Moreover, the text string/CG conversion processing section 131 can readily detect where to acquire character data 112 for the input text string (subject noun text string 601) by referring to the text string/character correspondence table 118.

Next, a configuration of the character/action correspondence table 120 is described in detail using FIG. 7. FIG. 7 is a configuration diagram of the character/action correspondence table 120 according to this embodiment.

The character/action correspondence table 120 is a table having a plurality of sets of character data name 701, a verb text string 702, an expression name text string 703 corresponding to the verb text string 702, and a link information 704 to action data 113 corresponding to the verb text string 702.

Moreover, in the character/action correspondence table 120, a plurality of verb text strings 702 are associated with one character data name 701. That is, the character/action correspondence table 120 has at least one or more action data 113 for one character data 112.

Moreover, in the character/action correspondence table 120, a link information 704 to a plurality of action data is associated with one verb text string 702. Moreover, in the character/action correspondence table 120, one or more expression name text strings 703 may be associated with one verb text string 702. That is, action data 113 having at least one or more expressions is associated with one verb text string 702.

By referring to the character/action correspondence table 120, the text string/CG conversion processing section 131 can readily detect whether there is the verb text string 702 corresponding to the action which a character input from the input section 104 can carry out, and can send a list of the verb text strings 702 to the display control section 127. Moreover, the text string/CG conversion processing section 131 can readily detect where to acquire action data 113 for the input verb text string 702 by referring to the character/action correspondence table 120.

Next, a configuration of the text string/set correspondence table 122 is described in detail using FIG. 8. FIG. 8 is the configuration diagram of the text string/set correspondence table 122.

The text string/set correspondence table 122 is a table having a plurality of sets of a location name text string 801, a link information 802 of set data 114 corresponding to the location name text string 801, an object name 803 which set data 114 corresponding to the location name text string 801 is provided with, an object adjective text string 804 for expressing the feature of the object which the object name 803 indicates, object parameters 805 such as the position and size of the object and the interaction range thereof.

Moreover, in the text string/set correspondence table 122, the link information 802 to a plurality of set data are associated with one location name text string 801. That is, the text string/set correspondence table 122 has at least one or more set data 114 for one location name text string 801.

Moreover, in the text string/set correspondence table 122, a plurality of object names 803 are associated for the link information 802 to one set data 114. That is, at least one or more objects 803 are associated with one set data 114.

By referring to the text string/set correspondence table 122, the text string/CG conversion processing section 131 can readily detect whether the location name text string 801 input from the input section 104 is available, and can send a list of the location name text strings 801 to the display control section 127. Moreover, the text string/CG conversion processing section 131 can readily detect an acquisition destination of set data 114 for the input location name text string by referring to the text string/set correspondence table 122.

Next, a configuration of the action dictionary 124 is described using FIG. 9. FIG. 9 is the configuration diagram of the action dictionary 124.

In the action dictionary 124, an information as to a plurality of verb text strings, and whether or not a plurality of verb text strings require an object, is described. In the example of FIG. 9, a verb text string with "+" being described (for example, "sit on") means it requires an object at the end. Moreover, a verb text string with "*" being described (for example, "stand up") means it requires an object in between. Moreover, a verb text string with "+" and "*" being described (for example, "made up") means it requires objects in between and at the end.

By referring to the action dictionary 124, the text string/CG conversion processing section 131 can readily detect whether or not a verb text string input from the input section 104 requires an object and the position thereof, and can send the information as to whether or not an object is required to the display control section 127.

Next, metadata stored in the metadata database 111 is described in detail using FIG. 10. FIG. 10 is a view showing a description example of the search result for the metadata database.

A search result 1000 for the metadata database shown in FIG. 10 is described in XML with an element "SearchResults" being a root. The element "SearchResults" consists of a plurality of "item" elements. Each "item" element serves as metadata 1006 of the searched material, in which the content of the material are described.

In metadata 1006 shown in FIG. 10, the type of the content is described as shown with 1001. In the example of FIG. 10, a "Character" is described as type of contents.

Moreover, in metadata 1006, a link address to a location where a thumbnail of material data for metadata 1006 is stored is described as shown with 1002.

Moreover, in metadata 1006, a link address to a location where an information of material data for metadata 1006 is stored is described as shown with 1003.

Moreover, in metadata 1006, a link address to a location where material data for metadata 1006 is stored is described as shown with 1004.

Moreover, in metadata 1006, features of material data for metadata 1006 are described as shown with 1005. The features 1005 are described with the attribute (type) and value (value) In the example of FIG. 10, the feature information defined by a set of an attribute "Genre" and a value "Human", an attribute "Sex" and a value "Female," an attribute "Wear" and a value "Shirt," an attribute "Shirt.Color" and a value "Blue," and an attribute "Age" and a value "Young" is described as the features 1005.

In this way, information which indicates a reference destination concerning a storage location of material data, a reference destination of the thumbnail which indicates material data and the features of material data is described in metadata 1006.

Figure 11:
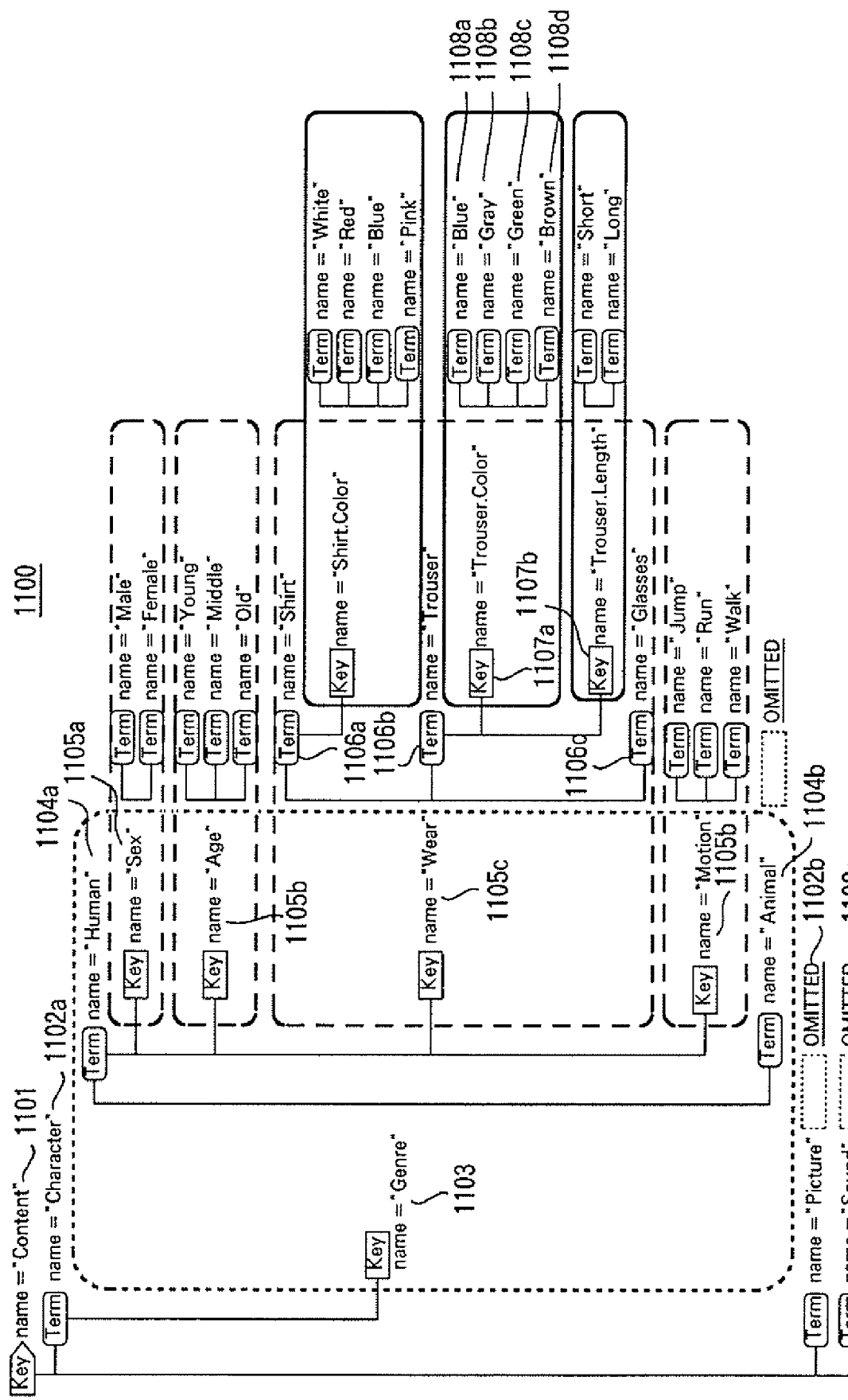
FIG. 11 is a first view showing the concept of a hierarchical structural description according to this embodiment.

Next, a configuration of the hierarchical structural description 130 which the search section 128 created from a plurality of metadata is described in detail using FIG. 11. FIG. 11 is a view showing the concept of the hierarchical structural description 130 for character data 112 or set data 114.

As shown with FIG. 11, a conceptual model 1100 of the hierarchical structural description 130 describes a plurality of sets of a "key" which indicates an attribute of material data, and a "term" which indicates a value for the attribute.

Moreover, in the conceptual model 1100 of the hierarchical structural description 130, an attribute "key" and a value "term" of a lower level concept (child element) are described under an attribute "key" and a value "term" of a higher level concept (parent element). That is, the conceptual model 1100 of the hierarchical structural description 130 hierarchically organizes and describes a plurality of attributes "keys" and values "terms."

For example, in the conceptual model 1100 of the hierarchical structural description 130 shown in FIG. 11, a key 1101 named "Content" of the highest level has a plurality of terms 1102*a* to 1102*c* named "Character," "Picture," and "Sound."

Moreover, under the term "Character" 1102*a*, there is a child element key "Genre" 1103, and the key "Genre" 1103 has child element terms "Human" 1104*a* and "Animal" 1104*b*.

Moreover, the term "Human" 1104*a* has a plurality of child elements; key "Sex" 1105*a*, key "Age" 1105*b*, key "Wear" 1105*c*, and a "Motion" 1105*d*.

Moreover, the key "Wear" 1105*c* has a plurality of child elements: a term "Shirt" 1106*a*, a term "Trouser" 1106*b*, and a term "Glasses" 1106*c*.

Moreover, the term "Trouser" 1106*b* has a plurality of child elements; a key "Trouser.Color" 1107*a* and a key "Trouser.Length" 1107*b*.

Moreover, the key "Trouser.Color" 1107*a* has a plurality of terms including a term "Blue" 1108*a*, a term "Gray" 1108*b*, a term "Green" 1108*c*, and a term "Brown" 1108*d*.

Although a plurality of child element terms also exist under the key "Sex" 1105*a*, the key "Age" 1105*b*, and the key "Motion" 1105*d*, the detailed description thereof is omitted. Moreover, although also under the term "shirt" 1106*a* and the term "Glasses" 1106*c* there are child element keys, detailed description thereof is omitted. Moreover, also under the key "Trouser.Length" 1107*b*, there are a plurality of child element terms.

In this way, in the conceptual model 1100 of the hierarchical structural description 130, the features of material data are hierarchically organized and managed into a plurality of attributes "keys" and values "terms."

As a result, it is possible to describe not only the vocabulary used in the "attributes" and "values" related to character data 112 and set data 114 which are managed in the metadata database, but also the semantic constraints.

Moreover, by managing the features of character data 112 and set data 114 using a plurality of attributes "keys" and values "terms", for example, a table using a set of "attribute" and "value" is often placed in a merchandise catalog of cars and household electrical appliances, however, by managing character data 112 and set data 114 in the same manner as the described above, managing data can be simplified and the features can be clarified further.

Figure 12:
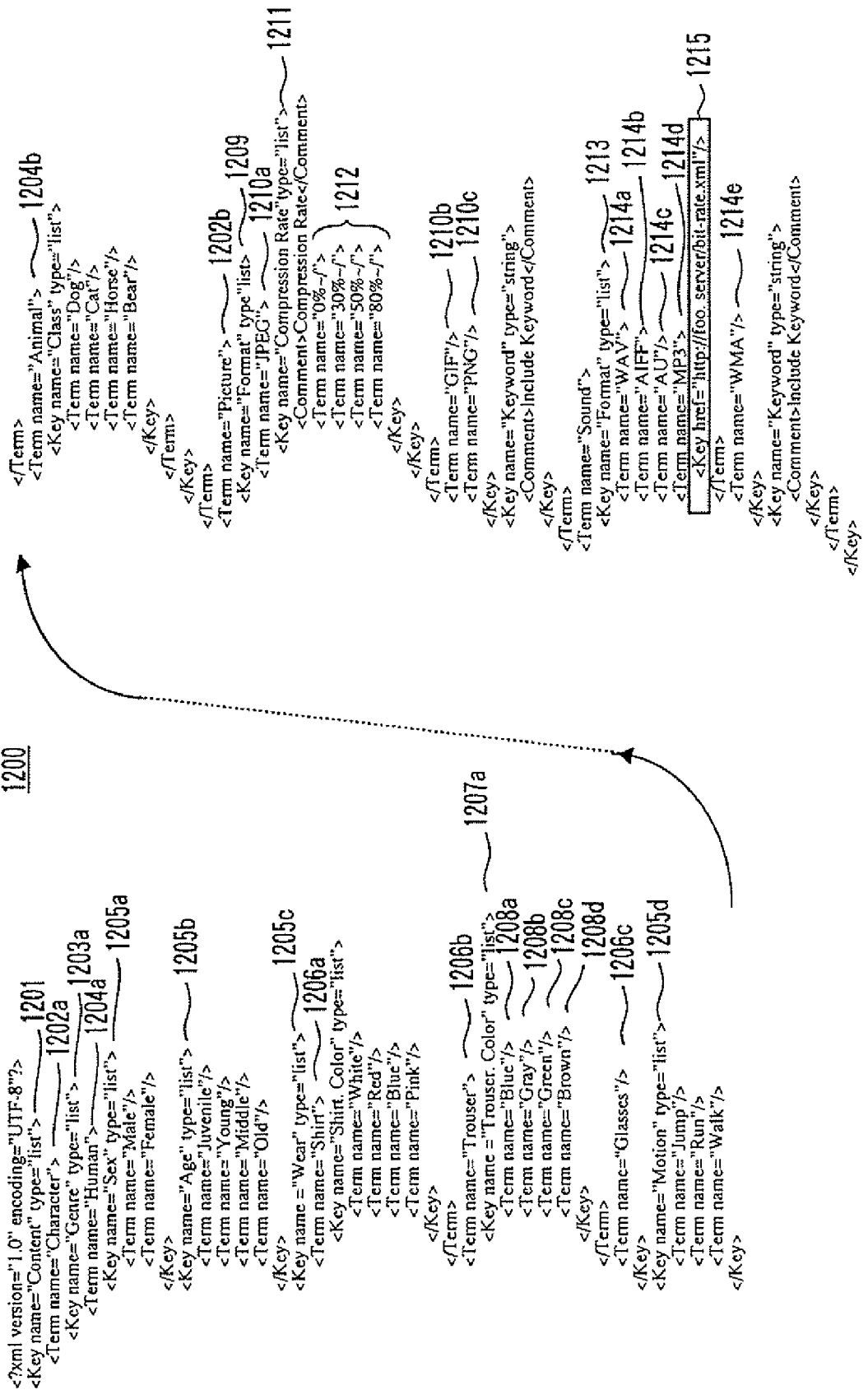
FIG. 12 is a first view showing a description example of the hierarchical structural description according to this embodiment.

Next, a specific description example 1200 of the hierarchical structural description 130 is described in detail using FIG. 12. FIG. 12 is a view showing a description example of the hierarchical structural description 130. In addition, the description example 1200 corresponds to the conceptual model 1100 of the vocabulary control table shown in FIG. 11. Moreover, the description example 1200 is an example of the hierarchical structural description 130, and description example 1200 is explained as the hierarchical structural description 1200 hereinafter.

The hierarchical structural description 1200 shown in FIG. 12 describes the conceptual model 1100 of the vocabulary management table shown in FIG. 11, in XML. In addition, for convenience of description, the vocabulary management table 1200 may not agree with the conceptual model 1100 of the vocabulary management table in some points.

Specifically, in the vocabulary management table 1200, a key "Content" 1201 of the highest level has a plurality of terms including a "Character" 1202a, a "Picture" 1202b, and a "Sound" 1202c.

Moreover, under the term "Character" 1202a, there is a child element key "Genre" 1203a, and the key "Genre" 1203a has child elements including a term "Human" 1204a and a term "Animal" 1204b.

Moreover, the term "Human" 1204a has a plurality of child elements including a key "Sex" 1205a, a key "Age" 1205b, a key "Wear" 1205c, and a key "Motion" 1205d.

Moreover, the key "Wear" 1205c has a plurality of child elements including a term "Shirt" 1206a, a term "Trouser" 1206b, and a term "Glasses" 1206c.

Moreover, the term "Trouser" 1206b has a child element key "Trouser.Color" 1207a.

Moreover, the key "Trouser.Color" 1207a has a plurality of terms including a term "Blue" 1208a, a term "Gray" 1208b, a term "Green" 1208c, and a term "Brown" 1208d.

In addition, although there are also a plurality of terms under the key "Sex" 1205a and the key "Age" 1205b, detailed description thereof is omitted. Moreover, although there are also keys under the term "shirt" 1206a and the term "Glasses" 1206c, detailed description thereof is omitted.

Moreover, under the term "Picture" 1202b, there is a child element key "Format" 1209, and the key "Format" 1209 has a plurality of child elements including a term "JPEG" 1210a, a term "GIF" 1210b, and a term "PNG" 1210c.

Moreover, the term "JPEG" 1210a has a child element key as shown with 1211 and furthermore, the key 1211 has a plurality of child element terms as shown with 1212.

Moreover, under the term "Sound" 1202c, there is a child element key "Format" 1213, and the key "Format" 1213 has a plurality of child element terms 1214a to 1214e.

Moreover, as shown with 1215, the term "MP3" 1214d has a link destination in which lower level child element keys and the like are described.

The link destination 1215 has a key "Bit Rate" 1301 as shown with FIG. 13, and the key "Bit Rate" 1301 has a plurality of child element terms as shown with 1302.

In this way, the description example 1200 can describe the explanation concerning the lower level of the term "MP3" 1214d using a link destination, that is, using other descriptions. Accordingly, the vocabulary management table can be divided into a plurality of portions to describe, and the respective descriptions can be managed separately.

In this way, the hierarchical structural description 130 hierarchically organizes and manages the attribute "key" and value "term", which are the features of material data. Accordingly, it is possible to roughly search for material data using the vocabulary of a higher level concept, and thereafter, search for material data in detail using the low level vocabulary.

Figure 14:
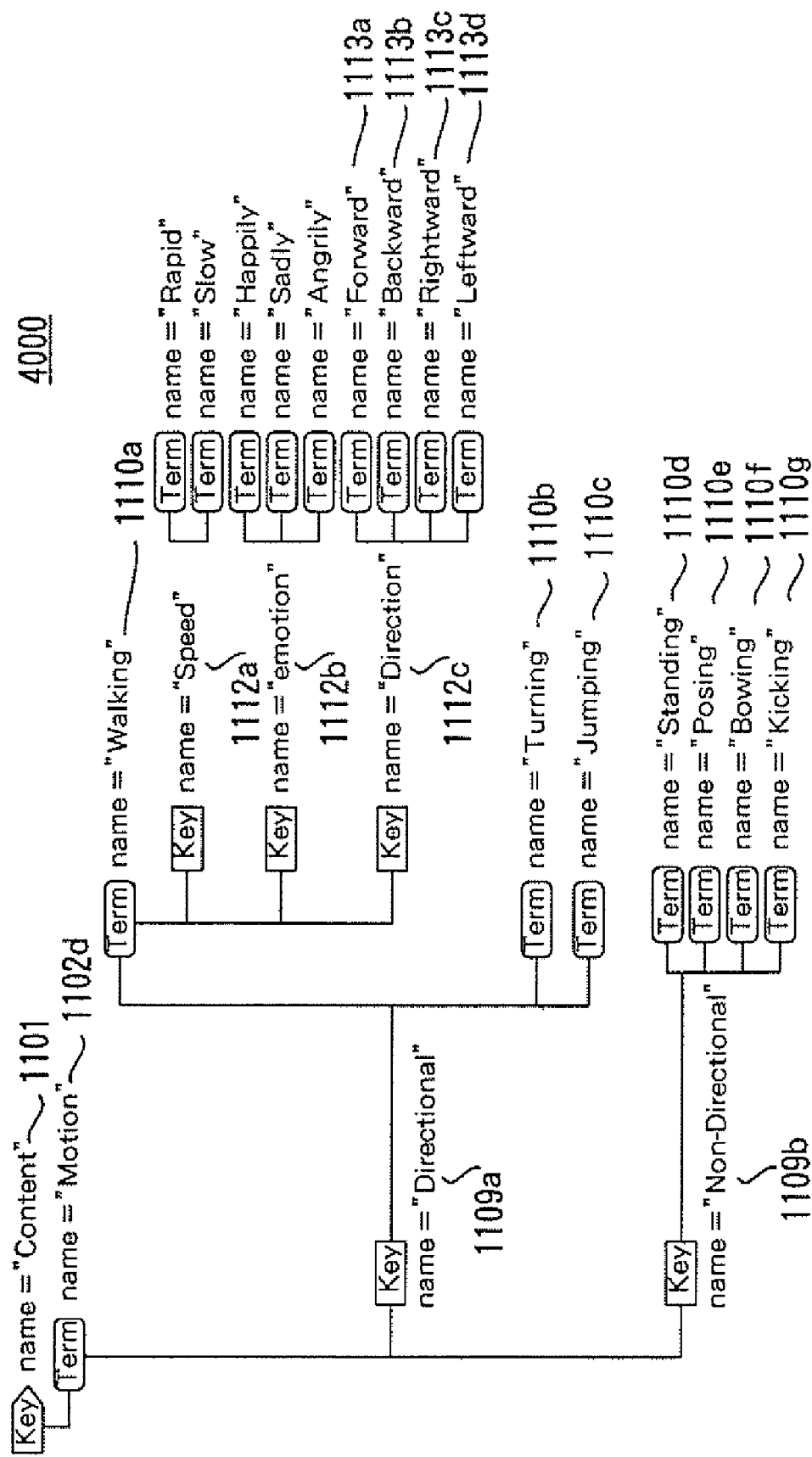
FIG. 14 is a second view showing the concept of the hierarchical structural description according to this embodiment.

Next, a configuration of the hierarchical structural description 130 for action data 113 is described in detail using FIG. 14.

As shown with FIG. 14, a conceptual model 4000 of the hierarchical structural description 130 for action data 113 hierarchically organizes and describes a plurality of attributes "keys" and values "terms" like the conceptual model 1100 shown in FIG. 11.

For example, in the conceptual model 4000, the key 1101 named "Content" of the highest level has a plurality of terms 1102d named "Motion."

Moreover, under the term "Motion" 1102d, there are child elements including a key "Directional" 1109a and a key "Non-Directional" 1109b. The key "Directional" 1109a has child elements including a term "Walking" 1110a, a term "Turning" 1110b, and a term "Jumping" 1110c.

Moreover, the key "Non-Directional" 1109b has child elements including a term "Standing" 1110d, a term "Posing" 1110e, a term "Bowing" 1110f, and a term "Kicking" 1110g.

Moreover, the term "Walking" 1110a has a plurality of child elements including a key "Speed" 1112a, a key "Emotion" 1112b, and a key "Direction" 1112c.

Moreover, the key "Direction" 1112c has a plurality of child elements including a term "Forward" 1113a, a term "Backward" 1113b, a term "Rightward" 1113c, and a term "Leftward" 1113d.

In addition, although also there are a plurality of child element terms under the key "Emotion" 1112b, detailed description is omitted.

In this way, the conceptual model 4000 of the hierarchical structural description 130 hierarchically organizes and manages the feature of material data into a plurality of attributes "keys" and values "terms."

Accordingly, not only the vocabulary used in the "attribute" and the "value" concerning action data 113 managed in the metadata database, but also the semantic constraints can be described.

Moreover, by managing the features of action data 113 with a plurality of attributes "keys" and values "terms", managing data can be simplified and the features can be clarified further.

Figure 15:
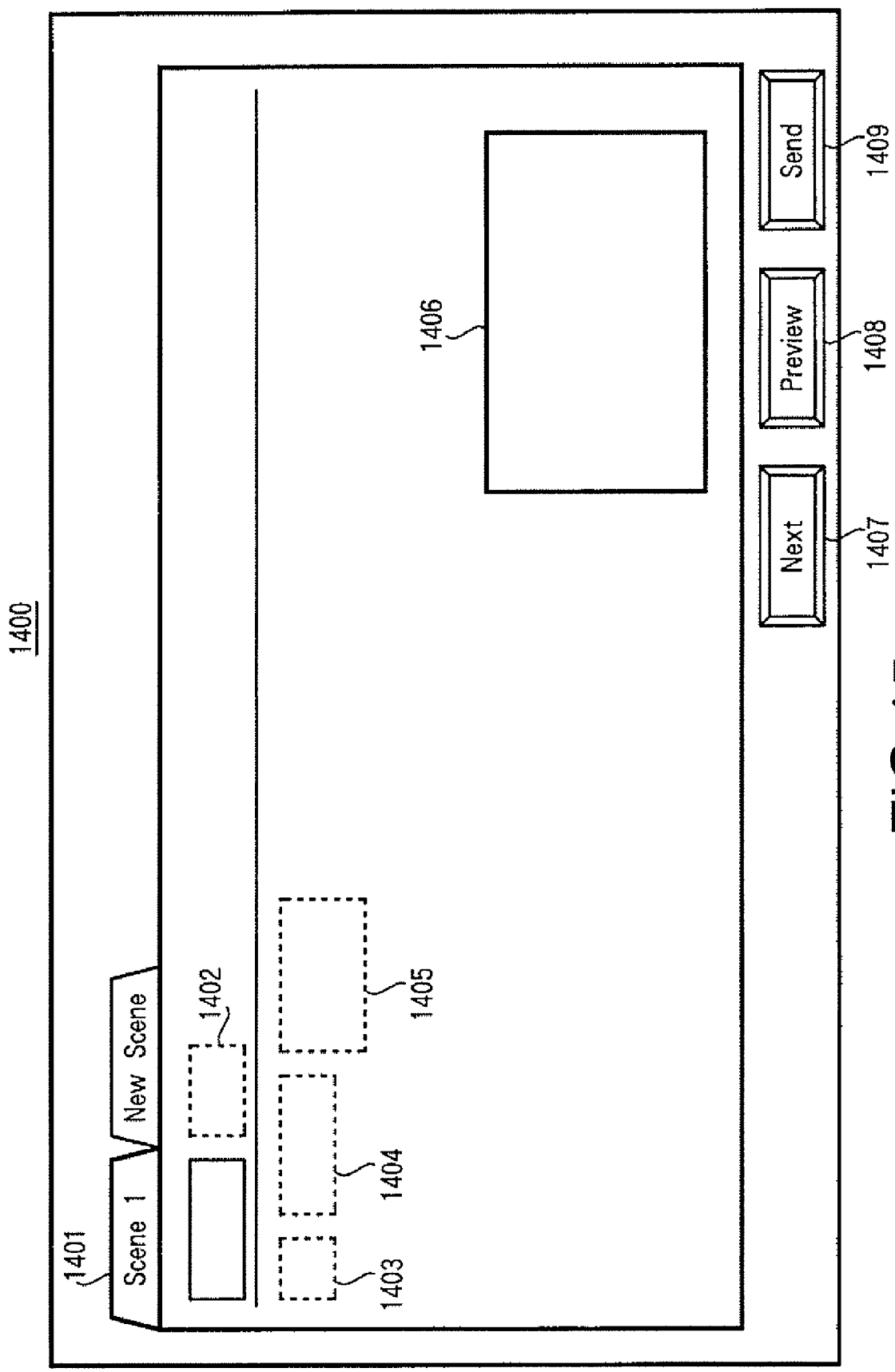
FIG. 15 is a view showing a GUI displayed at the time of creating animations according to this embodiment.

Next, a GUI which the display control section 127 creates at the time of creating animations is described in detail using FIG. 15. FIG. 15 is a view showing the GUI displayed at the time of creating animations.

The upper part of GUI 1400 is provided with a scene input section 1401 for setting a scene name of the computer graphics. In the scene input section 1401, a scene name such as a scene number is input.

Moreover, the lower part of the scene input section 1401 of GUI 1400 is provided with a location name text string input section 1402 for inputting information, such as a scene, situation, location and the like of the computer graphics.

The location name text string input section 1402 displays a list of location name text strings 801 available at the time when a user inputs a character. For example, if a user inputs one character, all the location name text strings 801 having this character at the beginning are displayed. Moreover, if a user inputs two characters, all the location name text strings 801 having these two characters at the beginning are displayed.

Accordingly, a user can recognize the location name text string 801 having set data 114 by referring to the location name text string input section 1402, and after recognizing this, a user can input the desired location name text string 801.

Moreover, there is a subject input section 1403 for inputting a subject of the computer graphics under the location name text string input section 1402 of GUI 1400.

The subject input section 1403 displays a list of the subject noun text strings 601 available at the time when a user inputs a character. For example, if a user inputs one character, all the subject noun text strings 601 having this character at the beginning are displayed. Moreover, if a user inputs two characters, all the subject noun text strings 601 having these two characters at the beginning are displayed.

Accordingly, a user can recognize the subject noun text string 601 having character data 112 by referring to the subject noun text string 601, and a user can input the desired subject noun text string 601 after recognizing.

Moreover, at the right hand of the subject input section 1403 of GUI 1400, there is an action input section 1404 to which content for operating the character are input.

At the time when a user sets the subject noun text string 601 to the subject input section 1403, the action input section 1404 displays a list of the verb text strings 702 corresponding to the set subject noun text string 601. Moreover, the action input section 1404 displays a list of the corresponding verb text strings 702 at the time when a user inputs a text. For example, if a user inputs one character of text, all the verb text strings 702 having this character at the beginning are displayed. Moreover, if a user inputs two characters of text, all the verb text strings 702 having these two characters at the beginning are displayed.

Moreover, after a user finished inputting the verb text string 702, if there is the expression name text string 703 corresponding to the input verb text string 702, the action input section 1404 displays its list. Moreover, also in this case, the action input section 1404 displays a list of the corresponding expression name text strings 703 at the time when a user inputs a text.

Accordingly, a user can recognize the verb text string 702 corresponding to the input text by referring to the action input section 1404, and after recognizing this, a user can input the desired verb text string 702.

Moreover, at the right hand of the action input section 1404 of GUI 1400, there is an object input section 1405 used for inputting an object with which the action interacts.

At the time when a user sets the verb text string 702 to the action input section 1404, the object input section 1405 displays a list of the object names 803 with which the set verb text string 702 interacts. Moreover, the object input section 1405 displays a list of the object names 803 with which can be interacted at the time when a user inputs the text. For example, if a user inputs one character of text, all the object names 803 having this character at the beginning are displayed.

Accordingly, a user can recognize the object name 803 corresponding to the input verb text string 702 by referring to the object input section 1405, and after recognizing this, a user can input the desired object name 803.

Moreover, the lower right portion of GUI 1400 is provided with a preview display section 1406 for displaying a preview of the computer graphics corresponding to the scenario which a user input from the location name text string input section 1402, the subject input section 1403, the action input section 1404, and the object input section 1405 of GUI 1400. Moreover, when the computer graphics is displayed in the preview display section 1406, a preview button 1408 which exists under the preview display section 1406 is used.

Moreover, the preview display section 1406 also displays a preview corresponding to the location name text string 801, a preview corresponding to the subject noun text string 601, a preview corresponding to the verb text string 702, and a preview corresponding to the object name 803.

Accordingly, a user can confirm the content of the computer graphics corresponding to the input scenario.

Moreover, the lower right hand of GUI 1400 is provided with a next candidate button 1407 for selecting data other than data corresponding to the location name text string 801, the subject noun text string 601, the verb text string 702, and the object name 803 which are used in the preview currently displayed in the preview display section 1406, if there are a plurality of data corresponding to the location name text string 801, the subject noun text string 601, the verb text string 702, and the object name 803 which the user selected in the location name text string input section 1402, the subject input section 1403, the action input section 1404, and the object input section 1405.

Accordingly, even if there are a plurality of data corresponding to the selected location name text string 801, the subject noun text string 601, the verb text string 702, and the object name 803, a user can select desired data from these data.

Moreover, the lower right hand of GUI 1400 is provided with a send button 1409 for sending to the display control section 127 the location name text string 801, subject noun text string 601, verb text string 702, and object name 803 corresponding to the preview displayed in the preview display section 1406, as selected data.

Figure 16:
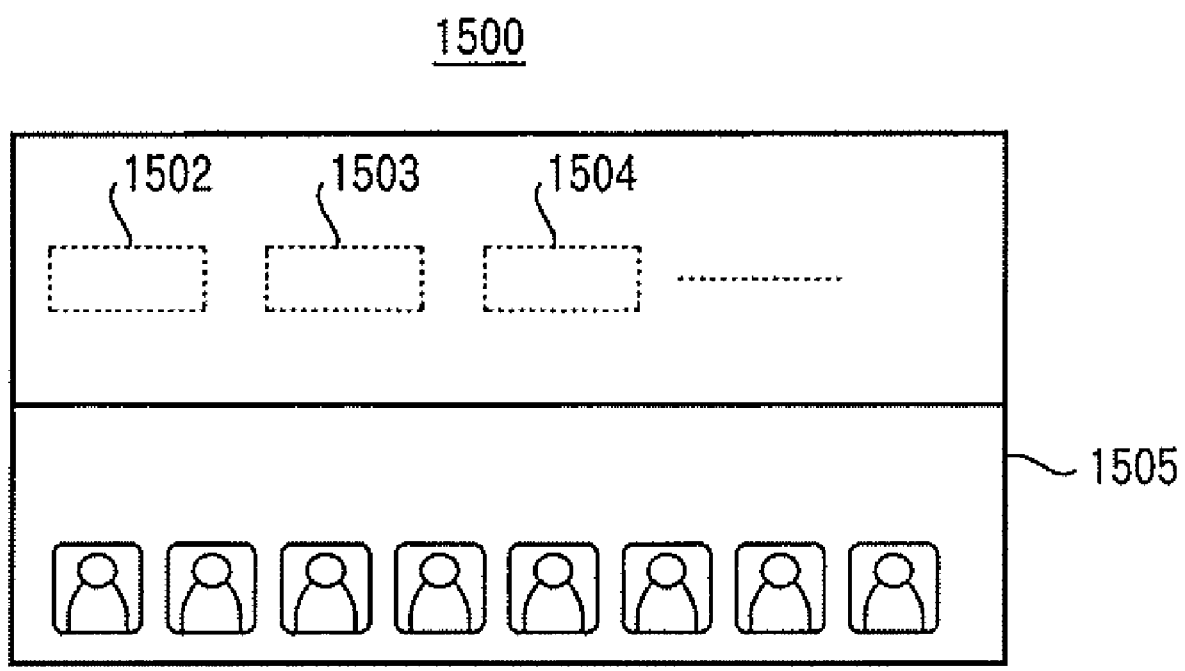
FIG. 16 is a configuration diagram of a GUI displayed at the time of searching for material data according to this embodiment.

Next, a GUI which the display control section 127 creates at the time of searching for material data is described in detail using FIG. 16. FIG. 16 is a configuration diagram of the GUI displayed at the time of searching for material data.

In the upper part of GUI 1500, a feature input section 1502 for inputting the feature in order to search material data is arranged.

At the time when a user inputs a text, the feature input section 1502, extracts the features (term, key) which partially match with the input text from the hierarchical structural description 130 and displays. For example, if a user inputs one character of text, all the features (term, key) having this character at the beginning are displayed. Moreover, if a user inputs two characters of text, all the features (term, key) having these characters at the beginning are displayed.

Moreover, GUI 1500 has a feature display section 1503 that displays the features (term, key) of the lower level or higher level corresponding to the determined features (term, key) in the case that a user determines the feature in the feature input section 1502. Moreover, GUI 1500 has a feature display section 1504 for displaying the features (term, key) of the lower level or higher level corresponding to the determined features (term, key) in the case that a user determines the features in the feature display section 1503. In addition, the number of the feature display sections 1503 and 1504 is not limited to the example of FIG. 15, but may be any number.

Moreover, the lower part of GUI 1500 is provided with a thumbnail display section 1505 for displaying thumbnails of material data for the determined features when a user determines the features in the feature display sections 1503 and 1504.

Accordingly, a user can learn the outline and the number of material data corresponding to the features determined in the feature display sections 1503 and 1504 by looking at the thumbnail display 1505.

Figure 17:
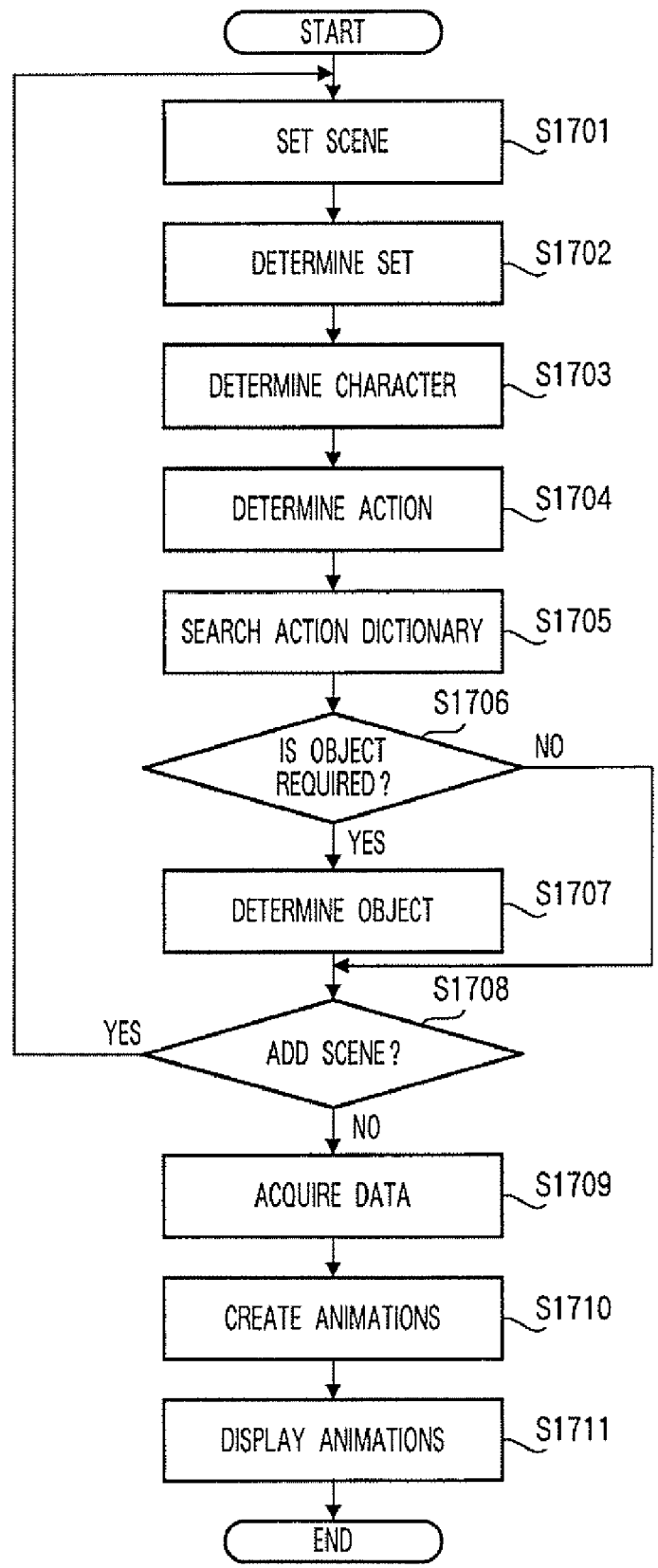
FIG. 17 is a flow chart of a process of determining a scenario of an image creating apparatus according to this embodiment.

Next, a scenario determination process of the image creating apparatus 100 is described in detail using FIG. 17. FIG. 17 is a flow chart of the scenario determination process of the image creating apparatus 100 according to this embodiment.

First, the image creating apparatus 100 monitors in the input control section 126 whether a scene is input from the scene input section 1401 of GUI 1400, and when a scene is input, sets the scene in the text string/CG conversion processing section 131 (S1701). Note that there may not be a scene. Moreover, a plurality of scenes may be set.

Next, the image creating apparatus 100 monitors in the input control section 126 whether the location name text string 801 is input from the location name text string input section 1402 of GUI 1400, and when the location name text string 801 is input, determines the set in the text string/CG conversion processing section 131 (S1702). In addition, the details of the process of S1702 will be described later. Note that animations may be created by default without selecting a set, or may be created without a set.

Next, the image creating apparatus 100 monitors, in the input control section 126, whether the subject noun text string 601 is input from the subject input section 1403 of GUI 1400, and when the subject noun text string 601 is input, determines the character in the text string/CG conversion processing section 131 (S1703). In addition, the details of the process of S1703 will be described later.

Next, the image creating apparatus 100 monitors, in the input control section 126, whether the verb text string 702 is input from the action input section 1404 of GUI 1400, and when the verb text string 702 is input, determines the action in the text string/CG conversion processing section 131 (S1704). In addition, the details of processing of S1704 will be described later.

Next, the image creating apparatus 100 searches the action dictionary 124 (S1705), and determines whether or not the action determined in S1704 requires an object (S1706).

Then, when the action requires an object in S1706, the text string/CG conversion processing section 131 refers to the text string/set correspondence table 122, extracts an object list, and sends to the display control section 127. Then, the display control section 127 displays a list of the object names. Then, the image creating apparatus 100 monitors, in the input control section 126, whether the object name 803 is input from the object input section 1005 of GUI 1400, and when the object name 803 is input, determines the object in the text string/CG conversion processing section 131 (S1707). In addition, the details of processing of S1707 will be described later.

Then, the image creating apparatus 100 monitors, in the input control section 126, whether a scene is added from the scene input section 1401 of GUI 1400 (S1708), and when a scene is added, carries out the processes from S1701 onward to the added scene.

On the other hand, if it is determined that an object is not required in S1706, then the image creating apparatus 100 skips a process of S1707 and moves to a process of S1708.

Next, the text string/CG conversion storage section 131 acquires material data (character data 112, action data 113 and set data 114) for the set, the character, the action, and object determined in the process described above (S1709), and creates animations using acquired material data (S1710), and displays the created animations in the monitor 105 (S1711).

In this way, after receiving an input of a scenario, the image creating apparatus 100 receives the input of the features for this scenario, acquires material data corresponding to these features, and creates animations using this material data.

As described above, the image creating apparatus 100 determines the scenario for creating computer graphics, and creates the animations.

Figure 18:
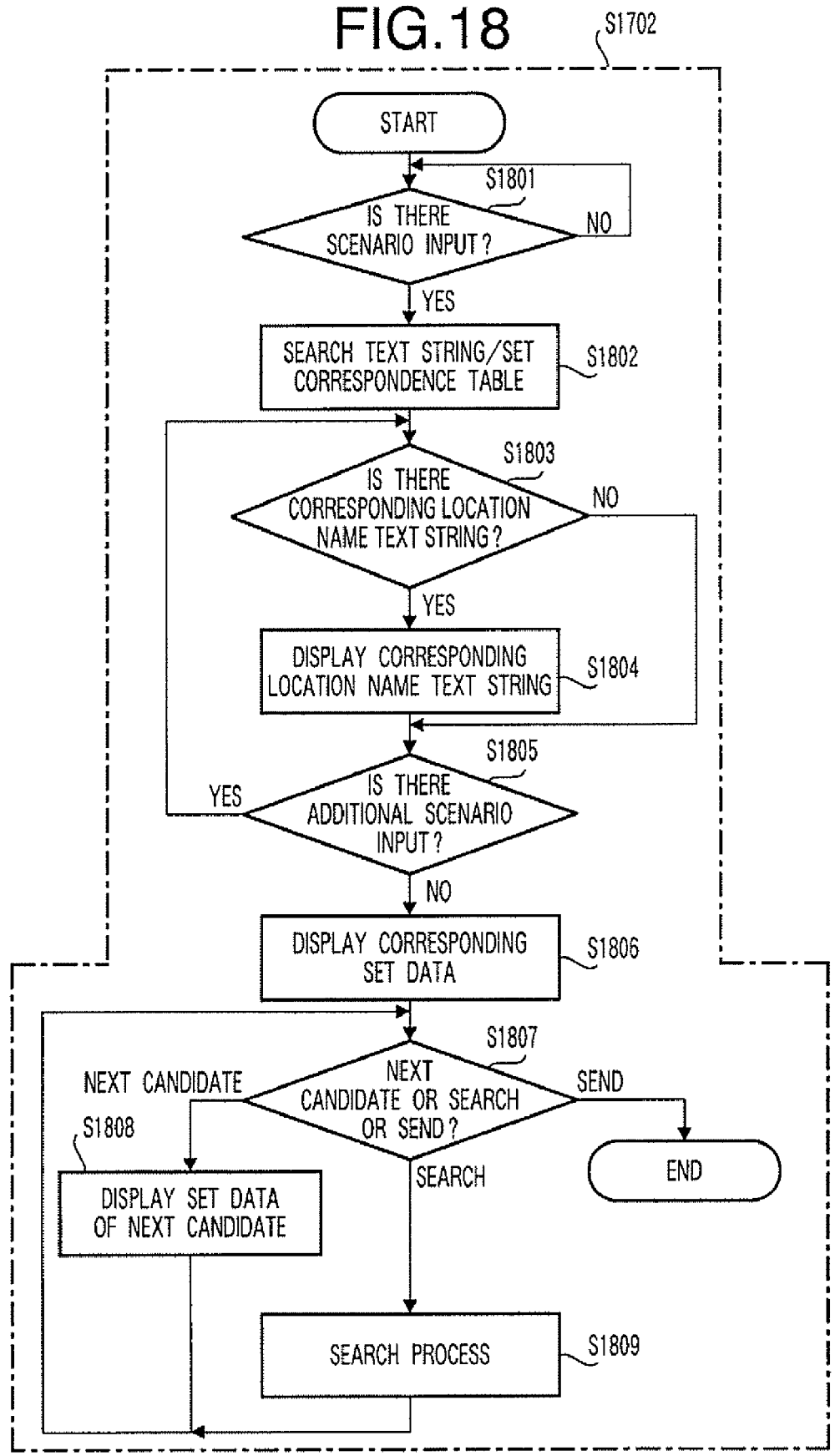
FIG. 18 is a flow chart of a process of determining a set of the image creating apparatus according to this embodiment.

Next, the operation of a set determination process (S1702) of the image creating apparatus 100 is described in detail using FIG. 18. FIG. 18 is a flow chart of the set determination process of the image creating apparatus 100.

First, the input control section 126 of the image creating apparatus 100 monitors whether a scenario is input from the input section 104 to GUI 1400 (S1801). Specifically, in S1801, it monitors whether there is a selection (click process) by a mouse and the like in the location name text string input section 1402, or monitors whether the location name text string 801 is input.

Then, upon an input of a scenario in S1801, the input control section 126, if the location name text string 801 is input, sends the input text to the text string/CG conversion processing section 131, and if there is a click process, informs of this fact.

Next, the text string/CG conversion processing section 131 searches for the text string/set correspondence table 122 (S1802). Then, when the text string/CG conversion processing section 131 receives a text concerning the location name text string 801, it searches whether there is the location name text string 801 having the sent text at the beginning.

Moreover, when the text string/CG conversion section 131 received an information that a click process occurred, it searches for all the location name text strings 801 in the text string/set correspondence table 122 (S1803).

Then, if the text string/CG conversion processing section 131 detected the location name text string 801 in S1803, it sends the detected location name text string 801 to the display control section 127. Then, the display control section 127 displays the sent location name text string 801 along with the input text in the location name text string input section 1402 (S1804).

Figure 19:
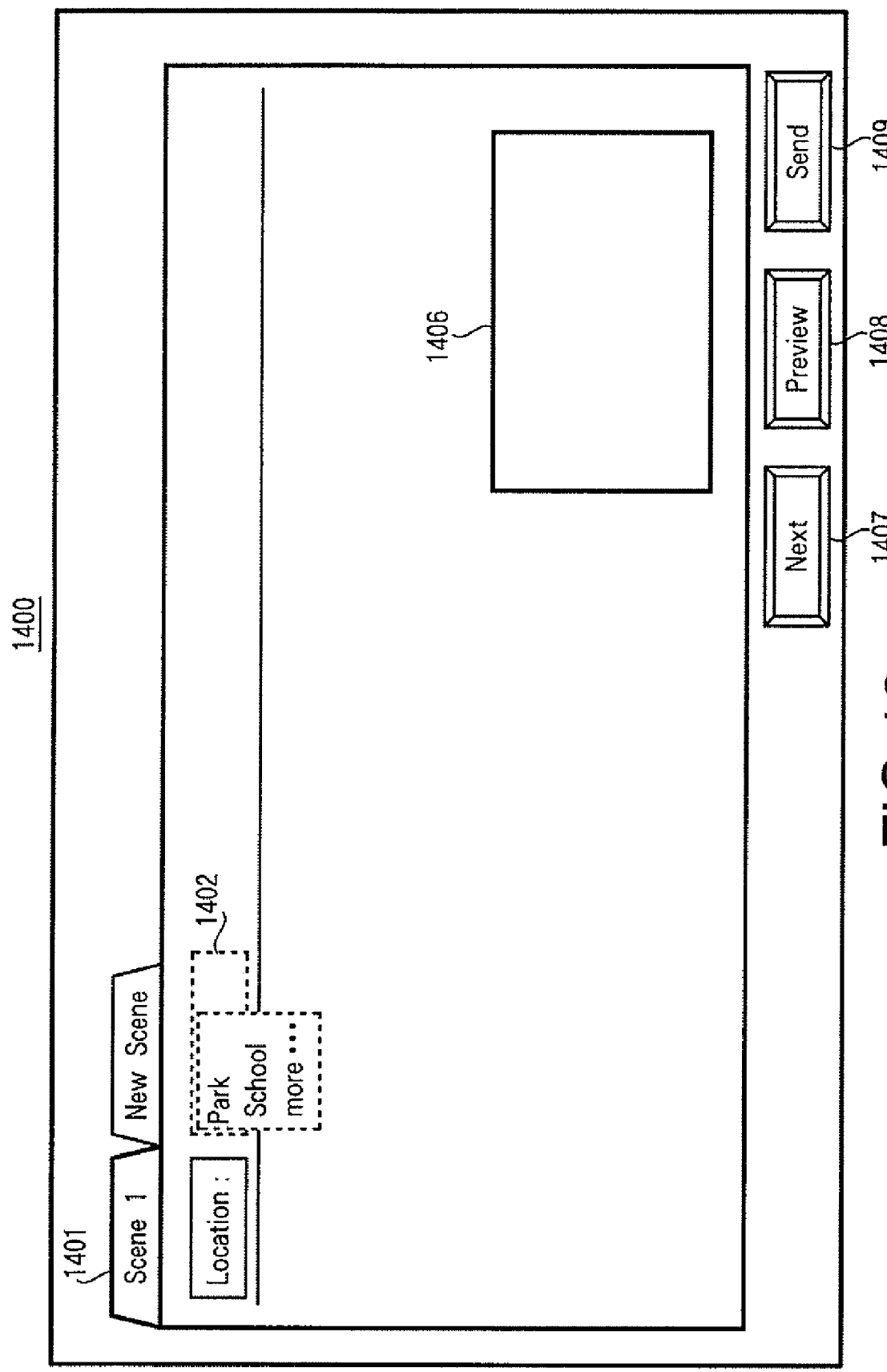
FIG. 19 is a view for explaining the process of determining a set of the image creating apparatus according to this embodiment.

For example, in S1801, if there is a click process in the location name text string input section 1402, the text string/CG conversion processing section 131 searches for all the location name text strings 801 from the text string/set correspondence table 122 (S1802 and S1803), and sends to the display control section 127. Then, as shown with FIG. 19, the display control section 127 displays "Park" and "School," which are the sent location name text strings 801, along with "more . . . " for carrying out a search process of set data 114 by the search section 128, in the location name text string input section 1402 (S1804).

By displaying a list of the location name text strings 801 this way, a user can recognize what locations can be used.

Moreover, in S1804, when a list of location name text strings 801 is displayed, a history of selections by the user so far is used to place the location name text strings 801 in descending order of the number of selections.

Next, the input control section 126 monitors whether additional scenario to the scenario input in S1801 is input (S1805). Then, in S1805, if a scenario is added, the processes from S1803 onward are carried out to the text string which includes the additional scenario.

Next, the input control section 126 monitors whether a user determines the location name text string 801 using the location name text string input section 1402, and if the user determined the location name text string 801, the determined location name text string 801 is sent to the text string/CG conversion processing section 131.

On the other hand, the text string/CG conversion processing section 131 refers to the text string/set correspondence table 122, and extracts the link 802 to set data 114 corresponding to the sent location name text string 801.

Next, the text string/CG conversion processing section 131 extracts set data 114 using the extracted link information 802, and sends extracted set data 114 to the display control section 127.

On the other hand, the display control section 127 previews sent set data 114 in the preview display section 1406 of GUI 1400 (S1806).

In addition, in this case, if there are a plurality of sent set data 114, the display control section 127 selects, for example, leading set data 114, and displays a preview for selected set data 114 in the preview display section 1406 of GUI 1400.

Next, the input control section 126 monitors whether a next candidate button 1407 of GUI 1400 is pressed, or whether "more . . . " displayed in the location name text string input section 1402 is selected, or whether a send button 1409 is pressed (S1807).

If it is determined that the send button 1409 is pressed in S1807, the display control section 127 completes the process and sends the created animations to another image creating apparatus 100 on Internet 107 from the transmission/reception section 106. In sending to another image creating apparatus 100, only animation data, or animation data and scenario data are sent. In another image creating apparatus 100, when the transmission/reception section 106 receives animation data, the display control section 127 previews this in the preview display section 1406 of GUI 1400. When the transmission/reception section 106 receives animation data and scenario data, the display control section 127 can preview this in the preview display section 1406 of GUI 1400, and input and edit the scenario like in the image creating apparatus 100 at the sending side.

Moreover, if it is determined that the next candidate button 1407 is pressed, the text string/CG conversion processing section 131 selects set data 114 other than set data 114 currently previewed in S1806 among set data 114 corresponding to the location name text strings 801 selected by the user in the location name text string input section 1402. Then, the text string/CG conversion processing section 131 sends selected set data 114 to the display control section 127, and the display control section 127 creates a preview using sent set data 114, displays this in the preview display section 1406 (S1808), and moves to a process of S1807.

In this way, all previews of set data 114 corresponding to the location name text strings 801 selected by a user can be displayed. As a result, a user can select set data 114 corresponding to the selected location name text string 801 after seeing the preview.

Moreover, if it is determined that "more . . . " displayed in the location name text string input section 1402 is selected in S1807, that is, that an execution of the search process of set data 114 by the search section 128 is instructed, the search section 128 carries out a search process (S1809), and moves to a process of S1807. In addition, the details of the search process (S1809) will be described later.

As described above, a list of the location name text strings 801 of set data 114 stored for a user can be displayed. Accordingly, a user can readily learn what set data 114 exists.

Moreover, by displaying a list of the location name text strings 801 of set data 114 selectable by GUI 1400, a user does not need to analyze the text string/set correspondence table 122, and a user can readily learn a list of selectable location name text strings 801.

Figure 20:
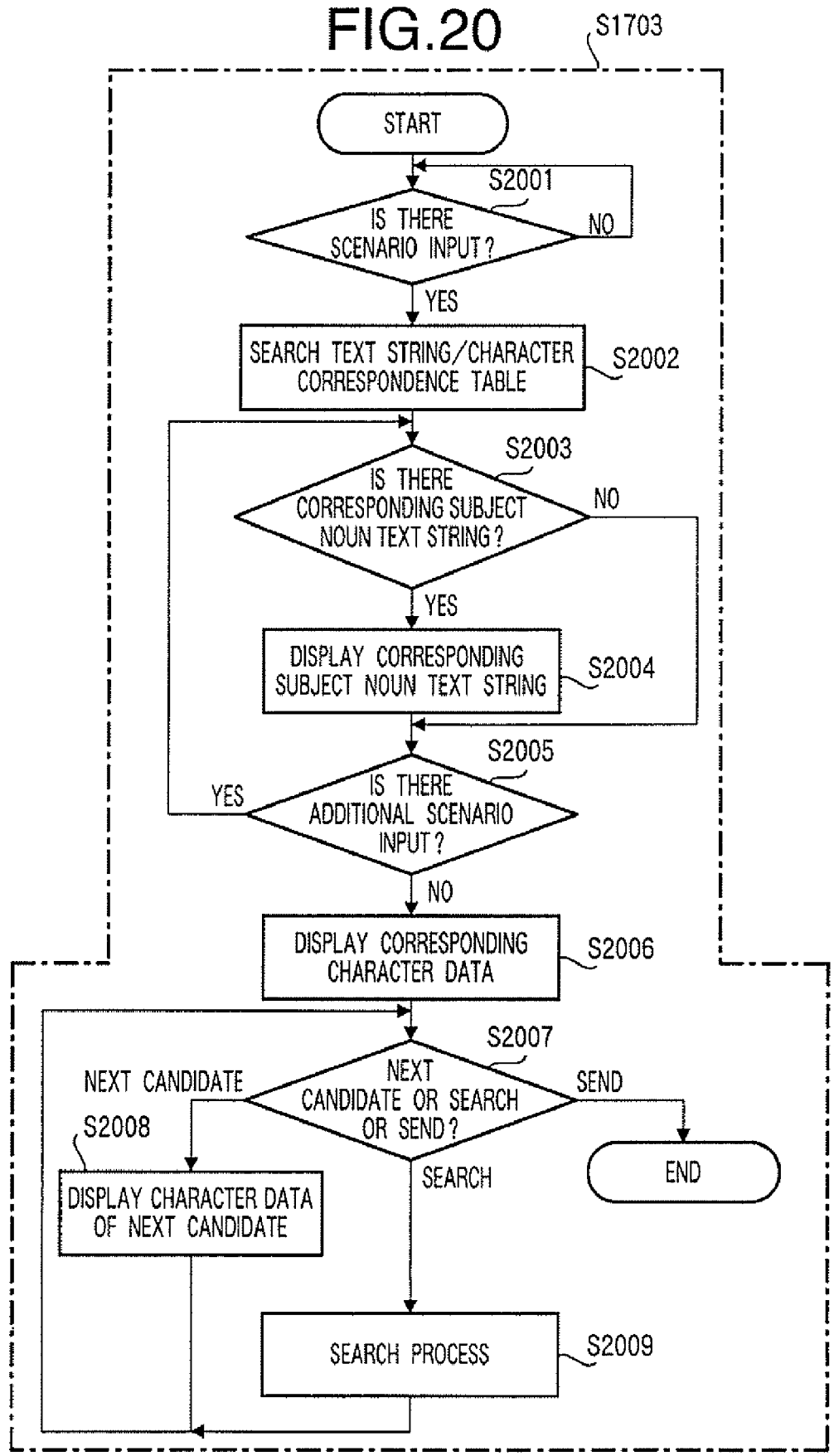
FIG. 20 is a flow chart of a process of determining a character of the image creating apparatus according to this embodiment.

Next, an operation of the character determination process (S1703) of the image creating apparatus 100 is described in detail using FIG. 20. FIG. 20 is a flow chart of the character determination process of the image creating apparatus 100.

The input control section 126 of the image creating apparatus 100 monitors whether a scenario is input from the input section 104 to GUI 1400 (S2001). Specifically, in S2001, it monitors whether there is a selection (click process) by a mouse and the like in the subject input section 1403, or whether a location name text string is input.

Then, upon an input of a scenario in S2001, the input control section 126, if the subject noun text string 601 is input, sends the input text to the text string/CG conversion processing section 131, and if there is a click process, informs of this fact.

Next, the text string/CG conversion processing section 131 searches the text string/character correspondence table 118 (S2002). Then, when a text concerning the subject noun text string 601 is detected, the text string/CG conversion processing section 131 searches whether there is a subject noun text string 601 having the sent text at the beginning. Moreover, upon receipt of an information that there is a click process, the text string/CG conversion section 131 searches for all the subject noun text strings 601 in the text string/character correspondence table 118 (S2003).

Then, when the subject noun text string 601 is detected in S2003, the text string/CG conversion processing section 131 sends the detected subject noun text string 601 to the display control section 127. Then, the display control section 127 displays the sent subject noun text string 601 along with the input text in the subject input section 1403 (S2004).

Figure 21:
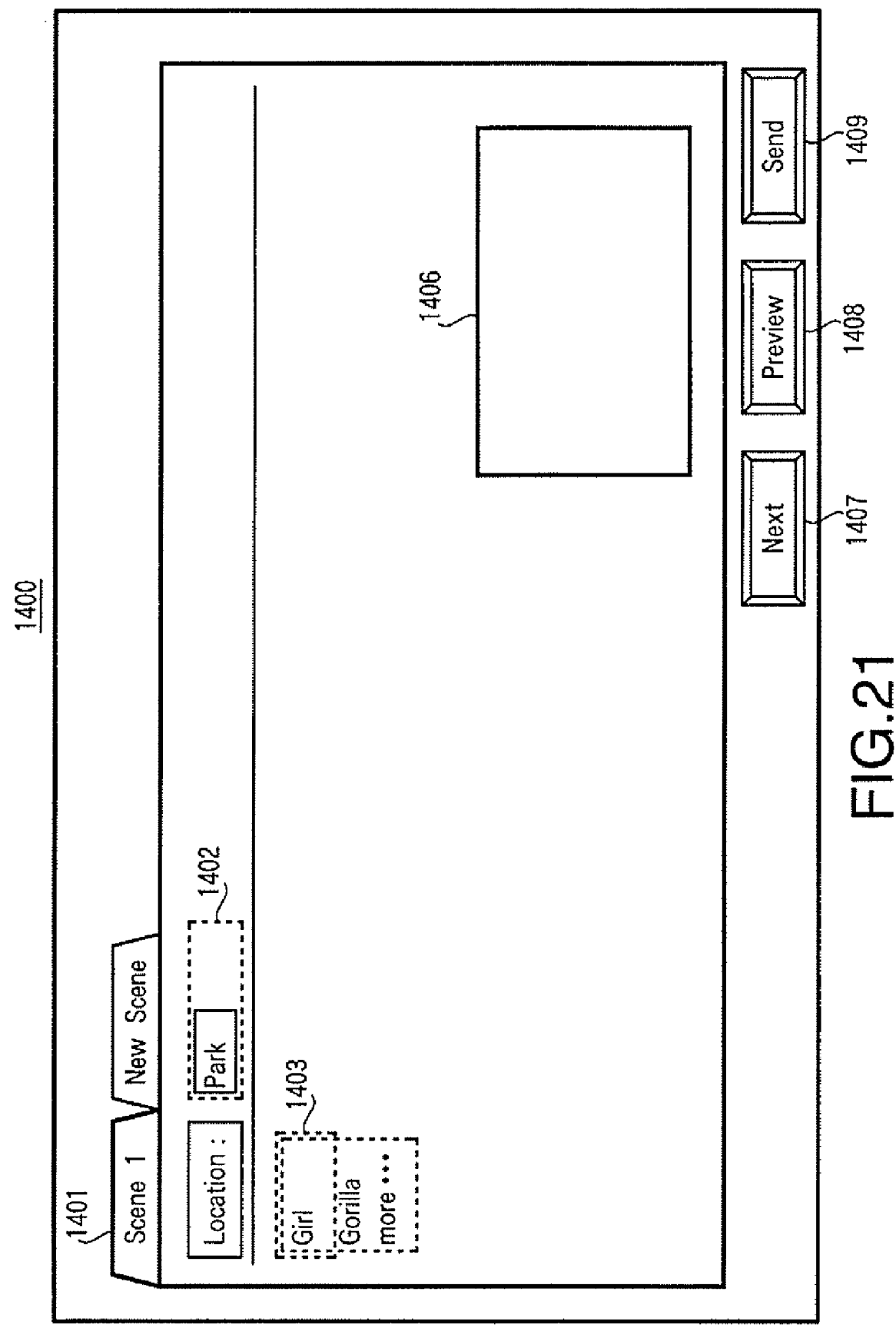
FIG. 21 is a view for explaining the process of determining a character of the image creating apparatus according to this embodiment.

For example, in S2001, if "G" is input in the subject input section 1403, the text string/CG conversion processing section 131 searches for the subject noun text string 601 having the "G" at the beginning from the text string/character correspondence table 118 (S2002 and S2003) and sends to the display control section 127. Then, as shown with FIG. 21, the display control section 127 displays "Girl" and "Gorilla," which are the sent subject noun text strings 601, along with "more . . . " for carrying out a search process of character data 112 by the search section 128, in the subject input section 1403 (S2004).

By displaying a list of the subject noun text strings 601 this way, a user can recognize what subject noun text strings 601 exist.

Moreover, when a list of subject noun text strings 601 is displayed in S2004, a history of selections by the user so far is used to place the subject noun text strings 601 in descending order of the number of selections. Moreover, the subject noun text strings 601 may be placed in descending order of the frequent use of the subject noun text strings 601 in the state where the location name text string 801 is selected.

Next, the input control section 126 monitors whether additional scenario to the scenario input in S2001 (S2005) is input. Then, if a scenario is added in S2005, the processes from S2003 onward are carried out to the text string which includes additional scenario.

Next, the input control section 126 monitors whether a user determines the subject noun text string 601 using the subject input section 1403, and if a user determines the subject noun text string 601, the input controller 126 sends the determined subject noun text string 601 to the text string/CG conversion processing section 131.

On the other hand, the text string/CG conversion processing section 131 refers to the text string/character correspondence table 118 and extracts the link 602 to character data 112 corresponding to the sent subject noun text string 601.

Next, the text string/CG conversion processing section 131 extracts character data 112 using the extracted link information 602, and sends extracted character data 112 to the display control section 127.

On the other hand, the display control section 127 previews sent character data 112 in the preview display section 1406 of GUI 1400 (S2006).

In addition, in this case, if there are a plurality of character data 112, the display control section 127 selects, for example, leading character data 112, and displays a preview for selected character data 112 in the preview display section 1406 of GUI 1400.

Next, the input control section 126 monitors whether a next candidate button 1407 of GUI 1400 is pressed, or whether "more . . . " displayed in the subject input section 1403 is selected, or whether a send button 1409 is pressed (S2007).

If it is determined that the send button 1409 is pressed in S2007, the display control section 127 completes the process and sends the created animations to another image creating apparatus 100 on Internet 107 from the transmission/reception section 106. In sending to another image creating apparatus 100, it sends only animation data, or animation data and scenario data. In another image creating apparatus 100, when the transmission/reception section 106 received animation data, the display control section 127 previews this in the preview display section 1406 of GUI 1400. When the transmission/reception section 106 receives animation data and scenario data, the display control section 127 can preview this in the preview display section 1406 of GUI 1400 and input and edit the scenario like in the image creating apparatus 100 at the sending side.

Moreover, if it is determined that the next candidate button 1407 is pressed, the text string/CG conversion processing section 131 selects character data 112 except character data 112 currently previewed in S2006 among character data 112 corresponding to the subject noun text strings 601 selected by the user in the subject input section 1403. Then, the text string/CG conversion processing section 131 sends selected character data 112 to the display control section 127, and the display control section 127 creates a preview using sent character data 112 to display it in the preview display section 1406 (S2008), and moves to the process of S2007.

In this way, it is possible to display a preview of all character data 112 corresponding to the subject noun text string 601 selected by the user. As a result, a user can select character data 112 corresponding to the selected subject noun text string 601 after seeing the preview.

Moreover, in S2007, if it is determined that "more . . . " displayed in the subject input section 1403 is selected, that is, it is determined that an execution of the search process of character data 112 by the search section 128 is instructed, the search section 128 carries out a search process (S2009), and moves to a process of S2007. In addition, the details of the search process (S2009) will be described later.

As described above, a list of the subject noun text strings 601 of character data 112 stored for a user can be displayed. Accordingly, a user can readily learn what character data 112 exist.

Moreover, by displaying a list of the subject noun text strings 601 of selectable character data 112 in GUI 1400, a user does not need to analyze the text string/character correspondence table 118, and can readily learn a list of the selectable subject noun text strings 601.

Figure 22:
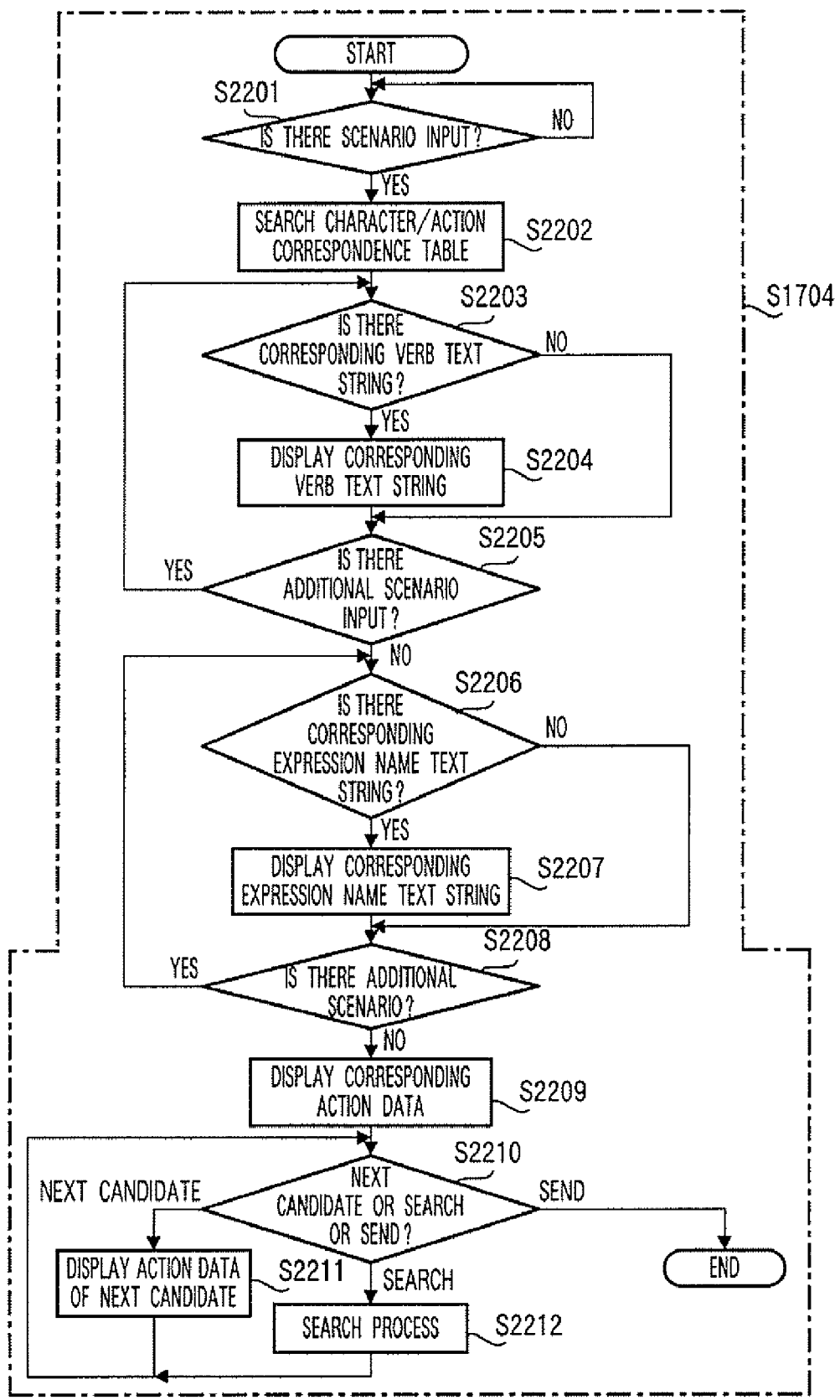
FIG. 22 is a flow chart of a process of determining an operation of the image creating apparatus according to this embodiment.

Next, the operation of the action determination process (S1704) of the image creating apparatus 100 is described in detail using FIG. 22. FIG. 22 is a flow chart of the action determination process of the image creating apparatus 100.

First, the input control section 126 of the image creating apparatus 100 monitors whether a scenario is input from the input section 104 to GUI 1400 (S2201). Specifically, in S2201, it monitors whether there is a selection (click process) by a mouse and the like in the action input section 1404, or whether the verb text string 702 is input.

Then, upon an input of a scenario in S2201, the input control section 126, if the verb text string 702 is input, sends the input text to the text string/CG conversion processing section 131, and if there is a click process, informs of this fact.

Next, the text string/CG conversion processing section 131 searches the character/action correspondence table 120 (S2202). Then, the text string/CG conversion processing section 131, when a text concerning the verb text string 702 is received, searches whether there is a verb text string 802 which corresponds to the subject noun text string 601 determined in the character determination process (S1703) shown in FIG. 17 and which has the sent text at the beginning. Moreover, upon receipt of the information that there is a click process, the text string/CG conversion section 131 searches for all the verb text strings 702 corresponding to the subject noun text string 601 determined in the character determination process (S1703) shown in FIG. 17 (S2203).

Then, when the verb text string 702 is detected in S2203, the text string/CG conversion processing section 131 sends the detected verb text string 702 to the display control section 127. Then, the display control section 127 displays the sent verb text string 702 along with the input text in the action input section 1404 side (S2204).

Figure 23:
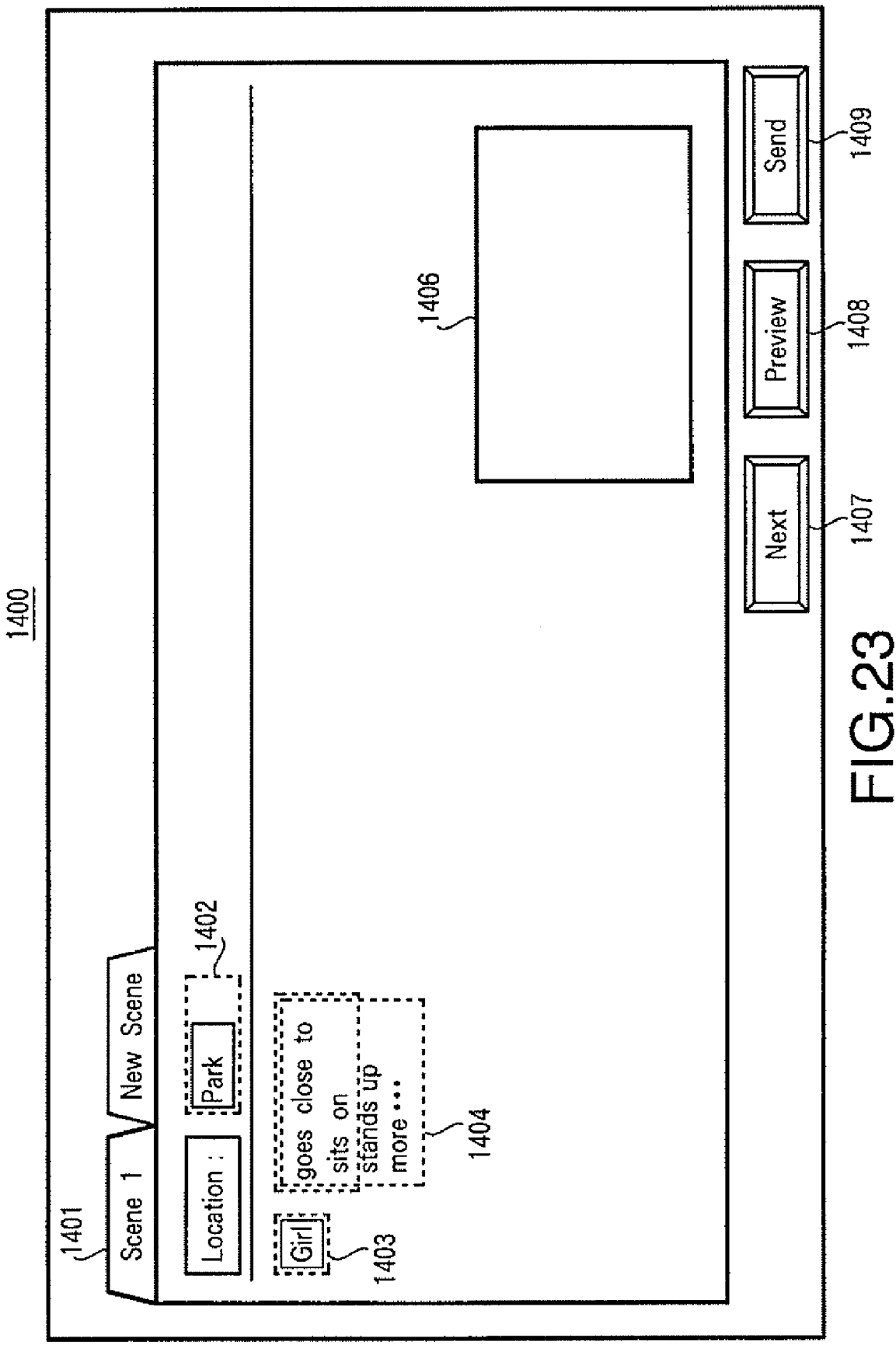
FIG. 23 is a view explaining the process of determining an operation of the image creating apparatus according to this embodiment.

For example, in S2201, if there is a click process in the action input section 1404, the text string/CG conversion processing section 131 searches from the character/action correspondence table 120 all the verb text strings 702 corresponding to the subject noun text string 601 (for example, "Girl") determined in the character determination process (S1703) shown in FIG. 17 (S2202 and S2203), and sends them to the display control section 127. Then, as shown with FIG. 23, the display control section 127 displays "goes close to," "sits on," and "stands up" which are the sent verb text strings 702, along with "more . . . " for carrying out a search process of character data 112 by the search section 128, in the action input section 1404 (S2204).

In this way, by displaying a list of the verb text strings 702, a user can recognize what kind of verb text string 702 can be selected.

Moreover, in S2204, when displaying a list of the verb text strings 702, a history of selections by the user so far is used to place the verb text strings 702 in descending order of the number of selections. Moreover, the verb text strings 702 are placed in descending order of the frequent use of the verb text string 702 in the state where the subject noun text string 601 is selected. Alternatively, the verb text strings 702 may be placed in descending order of the frequent use of the verb text strings 702 while the location name text string 801 and the subject noun text string 601 are selected.

Next, the input control section 126 monitors whether additional scenario to the scenario input in S2201 is input (S2205). Then, if a scenario is added in S2205, the processes from S2203 onward are carried out to the text string which includes additional scenario.

On the other hand, if any scenario is not added in S2205, the text string/CG conversion processing section 131 searches the character/action correspondence table 120 and searches whether there is the expression name text string 703 corresponding to the verb text string 702 displayed in S2204 (S2206).

Then, when the expression name text string 703 is detected in S2206, the text string/CC conversion processing section 131 sends the detected expression name text string 703 to the display control section 127. Then, the display control section 127 displays the sent expression name text strings 703 neighborhood near the action input section 1404 (S2207).

Next, the input control section 126 monitors whether any (additional) text (scenario) is input to the expression name text string 703 (S2208). Then, in S2208, if a scenario is added, the processes from S2206 onward are carried out to the text string which includes additional scenario.

Specifically, the text string/CG conversion processing section 131 searches for the expression name text string 703 which has the input text at the beginning. Then, the display control section 127 displays the searched expression name text string 703 in the monitor.

In this way, by displaying a list of the expression name text strings 703, a user can recognize what expression name text strings 703 can be selected.

Moreover, when displaying a list of the expression name text strings 703 in S2207, a history of selections by the user so far is used to list the expression name text strings 703 in descending order of the number of selections. Moreover, the expression name text strings 703 may be listed in descending order of the frequent use of the expression name text string 703 in the state where the subject noun text string 601 is selected, or the verb text strings 702 may be listed in descending order of the frequent use of the expression name text string 703 in the state where the location name text string 801 and the subject noun text string 601 are both selected, or the expression name text strings 703 may be listed in descending order of the frequent use the expression name text string 703 in the state where the verb text string 702 is selected, or the expression name text strings 703 may be listed in descending order of the frequent use the expression name text string 703 in the state where the location name text string 801 and the verb text string 702 are both selected, or the expression name text strings 703 may be listed in descending order of the frequent use the expression name text string 703 in the state where all three of the location name text string 801, subject noun text string 601, and verb text string 702 are selected.

Next, a user determines or monitors the verb text string 702 and the expression name text string 703 using the action input section 1404 or the like of GUI 1400, and when the user determined the verb text string 702 and the expression name text string 703, the determined verb text string 702 and expression name text string 703 are sent to the text string/CG conversion processing section 131.

On the other hand, the text string/CG conversion processing section 131 refers to the character/action correspondence table 120, and extracts the link 704 to action data corresponding to the sent verb text string 702 and the expression name text string 703.

Next, the text string/CG conversion processing section 131 extracts action data 113 using the extracted link information 704 and sends extracted action data 113 to the display control section 127.

On the other hand, the display control section 127 previews sent action data 113 in the preview display section 1406 of GUI 1400 (S2209).

In addition, in this case, if there are a plurality of sent action data 113, the display control section 127 selects, for example, leading action data 113 and the like, and displays a preview for selected action data 113 in the preview display section 1406 of GUI 1400.

Next, the input control section 126 monitors whether the next candidate button 1407 of GUI 1400 is pressed, or whether the "more . . . " displayed in the action input section 1404 is selected, or whether the send button 1409 is pressed (S2210).

If it is determined that the send button 1409 is pressed in S2210, the display control section 127 ends the process. If it is determined that the next candidate button 1407 is pressed, the text string/CG conversion processing section 131 selects action data other than action data currently previewed in S2209 among action data 113 corresponding to the verb text strings 702 and the expression name text string 703 selected by the user in GUI 1400. Then, the text string/CG conversion processing section 131 sends selected action data to the display control section 127, and the display control section 127 creates a preview using sent action data, displays it in the preview display section 1406 (S2211) and moves to the process of S2210.

In this way, all previews of action data 113 corresponding to the verb text string 702 and the expression name text string 703 selected by the user can be displayed. As a result, a user can select action data 113 corresponding to the selected verb text string 702 and the expression name text string 703, after seeing the preview.

Moreover, if it is determined that "more . . . " displayed in the action input section 1404 in S2207 was selected, that is, that an execution of the search process of action data 113 by the search section 128 is instructed, the search section 128 carries out a search process (S2212) and moves to a process of S2207. In addition, the details of the search process (S2212) will be described later.

As described above, a list of the verb text strings 702 and the expression name text strings 703 stored for a user can be displayed. Accordingly, a user can readily learn what kind of action data 113 exist.

Moreover, by displaying a list of the verb text strings 702 and the expression names 701 of selectable action data 113 in GUI 1400, a user does not need to analyze the character/action correspondence table 120 and can readily learn a list of the selectable verb text strings 702 and the expression name text strings 703.

Figure 24:
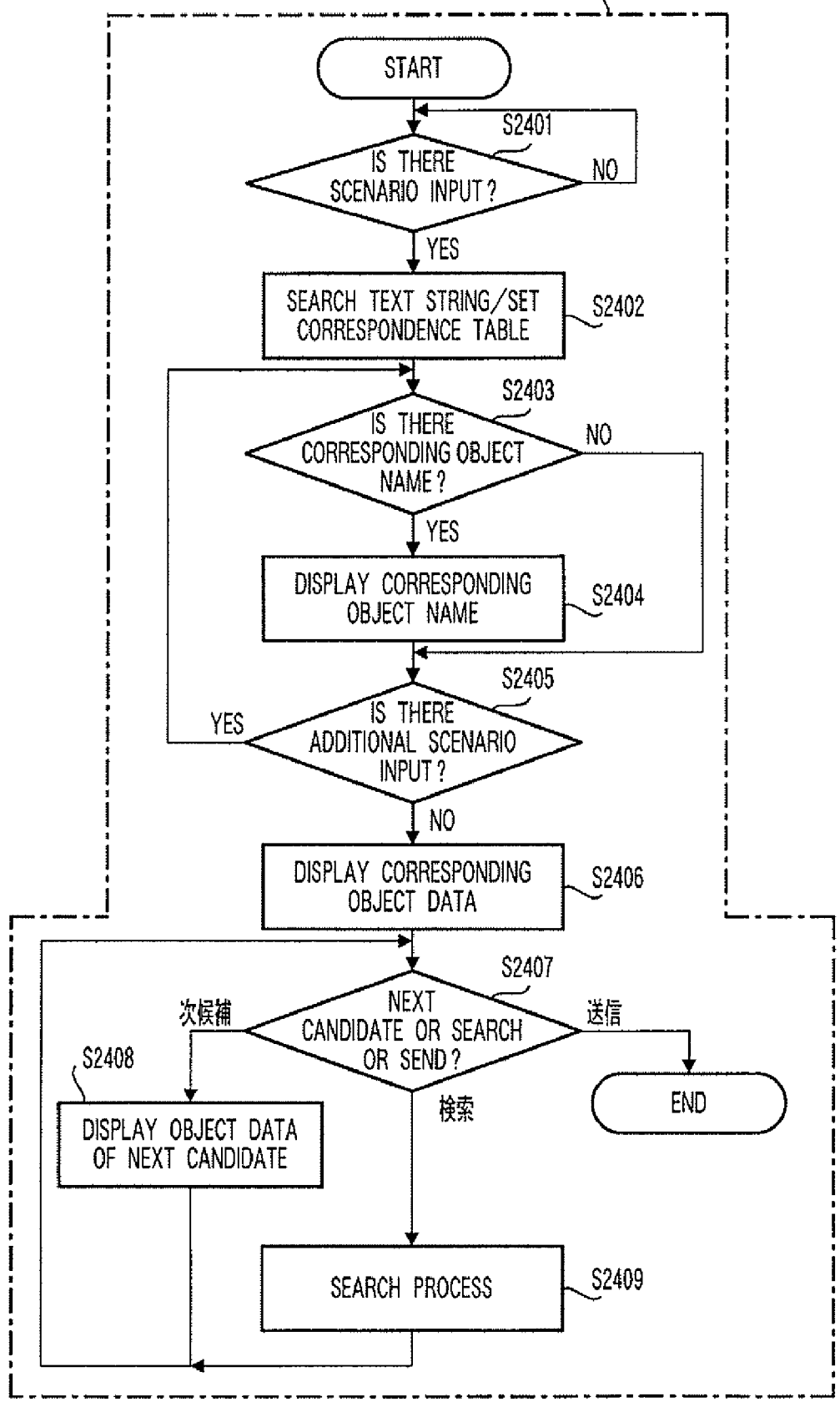
FIG. 24 is a flow chart of a process of determining an object of the image creating apparatus according to this embodiment.

Next, the operation of the object determination process (S1707) of the image creating apparatus 100 is described in detail using FIG. 24. FIG. 24 is a flowchart of the object determination process of the image creating apparatus 100.

The input control section 126 of the image creating apparatus 100 monitors whether a scenario is input from the input section 104 for GUI 1400 (S2401). Specifically, it monitors in S2401 whether there is a selection (click process) by a mouse and the like in the object input section 1405, or whether an object name is input.

Then, upon an input of a scenario in S2401, the input control section 126, if an object name is input, sends the input text to the text string/CG conversion processing section 131, and it there is a click process, informs of this fact.

Next, the text string/CG conversion processing section 131 searches the text string/set correspondence table 122 (S2402). Then, when the text string/CG conversion processing section 131 received a text concerning the object name 803, it searches whether there is the object name 803 which corresponds to the location name text string 801 determined in S1702 and which also has the sent text at the beginning. Moreover, upon receipt of an information that a click process occurred, the text string/CG conversion section 131 searches for all the location name text strings 801 in the text string/set correspondence table 122 (S2403).

Then, when the text string/CG conversion processing section 131 detected the object name 803 in S2403, it sends the detected object name 803 to the display control section 131. Then, the display control section 131 displays the sent object name 803 along with the input text of the object input section 1405 (S2404).

Figure 25:
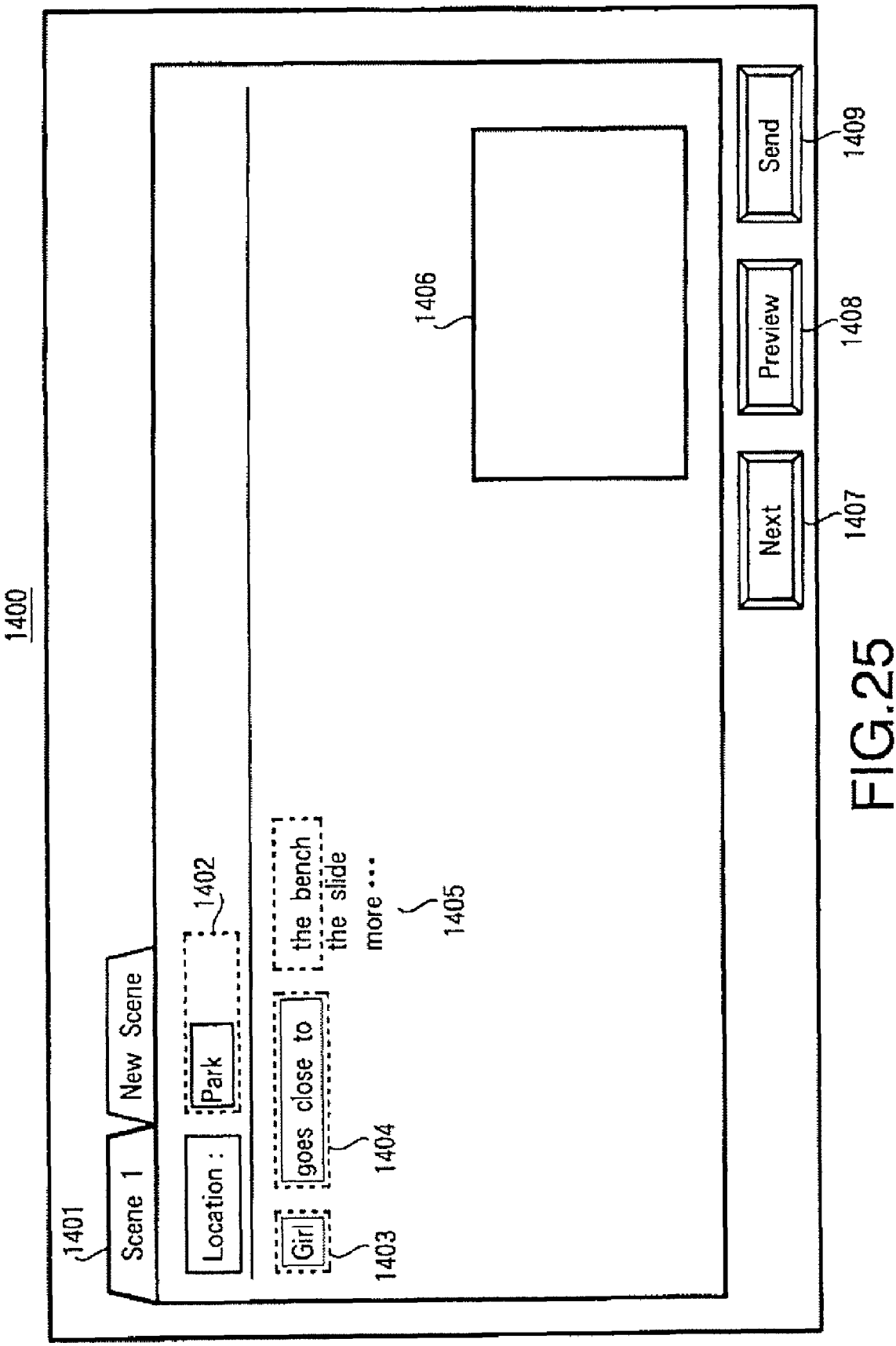
FIG. 25 is a view explaining the process of determining an object of the image creating apparatus according to this embodiment.

For example, in S2401, if there is a click process in the object input section 1405, the text string/CG conversion processing section 131 searches from the text string/set correspondence table 122 all the object names 803 corresponding to the location name text string 801 determined in S1702 (S2402 and 2403) to send to the display control section 127. Then, as shown with FIG. 25, the display control section 127 displays "the bench" and "the slide," which are the sent object names 803, along with "more . . . " for carrying out a search process of set data 114 by the search section 128, in the object input section 1405 (S2404).

By displaying a list of the object names 803 this way, a user can recognize what kind of object name 803 can be selected.

Moreover, when displaying a list of the object names 803 in S2404, a history of selections by the user so far is used to list the object names 803 in descending order of the number of selections.

Next, the input control section 126 monitors whether additional scenario to the scenario input in S2401 is input (S2405). Then, if a scenario is added in S2405, the processes from S2403 onward are carried out to the text string which includes additional scenario.

Next, the input control section 126 monitors whether a user determines the object name 803 using the object input section 1405, and if a user determines the object name 803, sends the determined object parameter 805 to the text string/CG conversion processing section 131.

On the other hand, the display control section 127 previews the sent object parameter 805 in the preview display section 1406 of GUI 1400 so that the already selected character interacts in the currently selected action (e.g., sit on a chair) (S2406).

Next, the input control section 126 monitors whether the next candidate button 1407 of GUI 1400 is pressed, or whether "more . . . " displayed in the object input section 1405 is selected, or whether the send button 1409 is pressed (S2407).

If it is determined that the send button 1409 is pressed in S2407, the display control section 127 ends the process, and if it is determined that the next candidate button 1407 is pressed, the text string/CG conversion processing section 131 selects an object other than the object currently previewed in S2406 among object data corresponding to the object name 803 selected by the user in the object input section 1405. Then, the text string/CG conversion processing section 131 sends the selected object parameter to the display control section 127, and the display control section 127 creates a preview using the selected object parameter, displays it in the preview display section 1406 (S1808), and moves to a process of S2407.

In this way, a preview of the object parameter 805 corresponding to all the objects corresponding to the object name 803 selected by the user can be displayed. As a result, a user can select the object corresponding to the selected object name 803 after seeing the preview.

Moreover, if it is determined that "more . . . " displayed in the object input section 1405 was selected in S2407, that is, that an execution of the search process of set data (object data) 114 by the search section 128 is instructed, the search section 128 carries out a search process (S2409), and moves to a process of S2407. In addition, the details of the search process (S2409) will be described later.

In this way, a list of the object names 803 selectable for a user can be displayed. Accordingly, a user can readily learn what object name 803 can be selected. Moreover, the object names 803 may be listed in descending order of the frequent use of the object names 803 in the state where the verb text string 702 is selected, or the object name 803 may be listed in descending order of the frequent use of the object name 803 in the state where the location name text string 801 and the verb text string 702 are both selected, or the object name 803 may be listed in descending order of the frequent use of the object name 803 in the state where all three of the location name text string 801, the subject noun text string 601, and the verb text string 702 are selected.

As described above, according to this embodiment, the actions, the characters, and the sets which a user can select, and furthermore the objects for action can be displayed as a list. This allows a user to readily recognize the selectable actions, characters, and sets, and furthermore objects for action and to select after recognizing, and the computer graphics can be therefore created from scenario readily and certainly.

Figure 26:
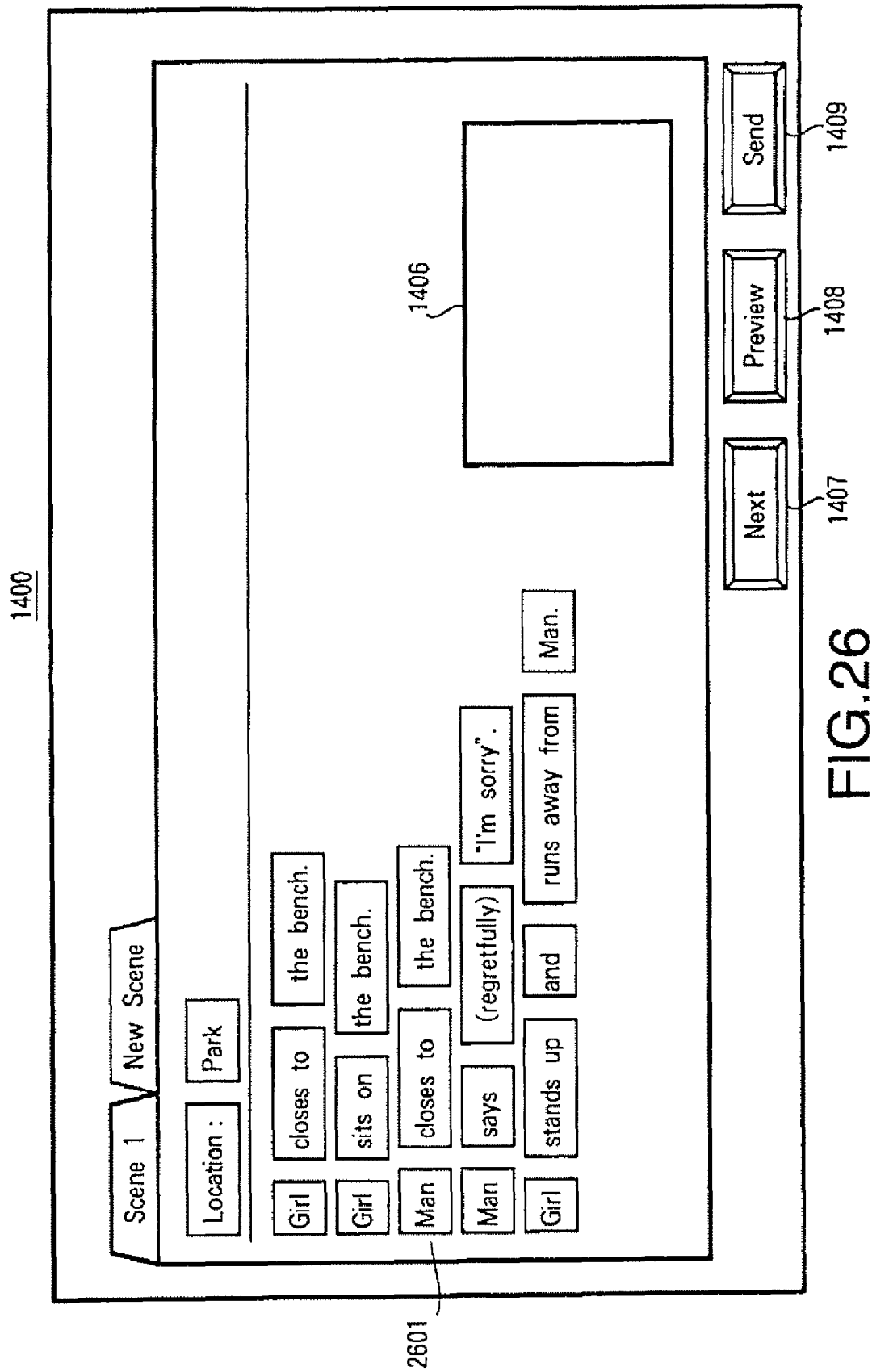
FIG. 26 is a view for explaining a scenario input of the image creating apparatus according to this embodiment.

Moreover, the image creating apparatus 100 can put scenario consisting of a plurality of sentences can also be input to GUI 1400 as shown with FIG. 26. In this case, computer graphics placed in descending order of the hierarchy level of the sentences can be created.

Figure 27:
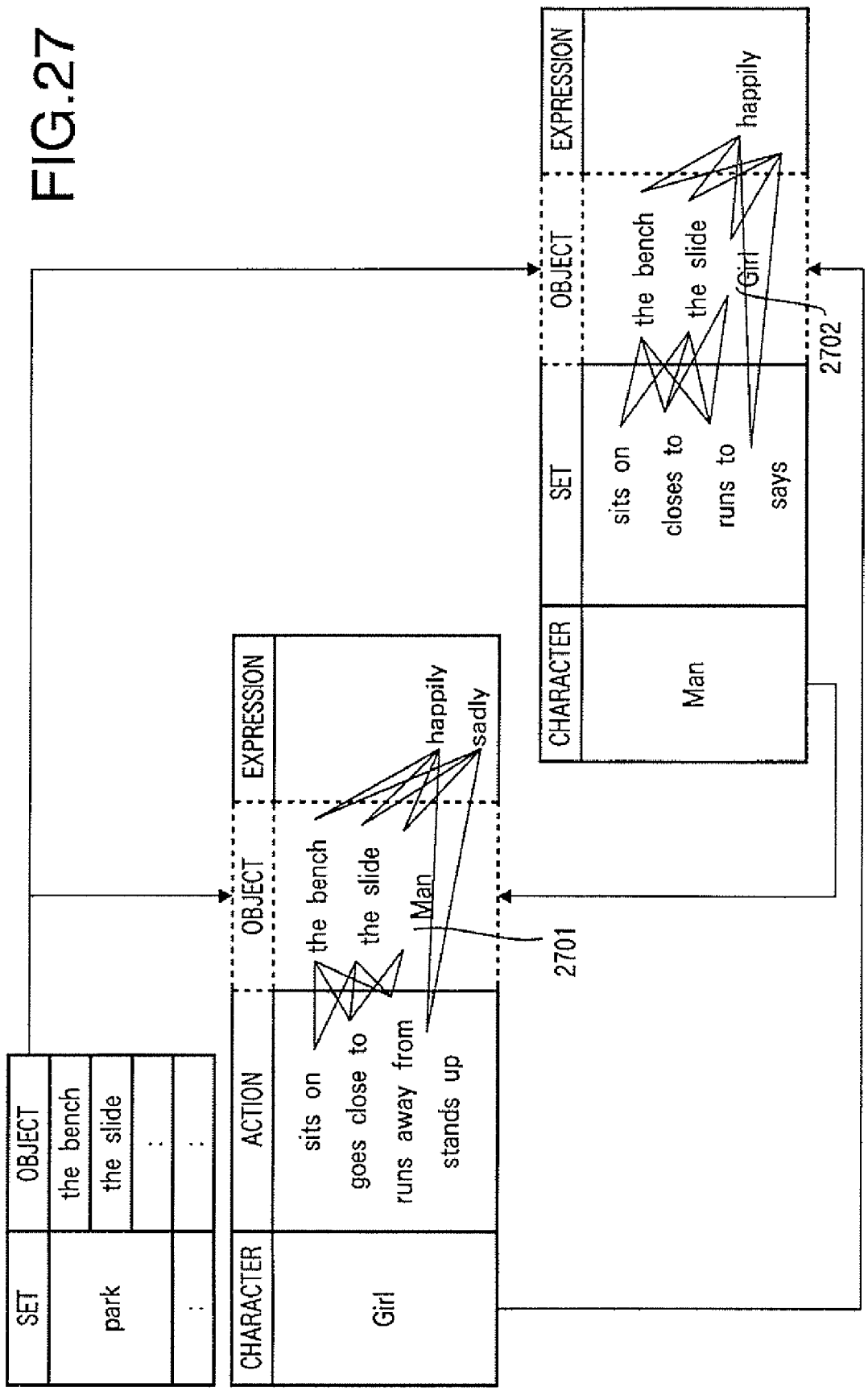
FIG. 27 is a view for explaining a relationship between objects according to this embodiment.

Moreover, in the case where scenario consisting of a plurality of sentences as shown with FIG. 26 is input, a text ("Man") different from a text ("Girl") of the first sentence may appear like in the reference numeral 2601 in the figure. In this case, as shown with FIG. 27, at the time when a plurality of characters appears, other character is added to the object with which one character interacts. In the example of FIG. 27, a "Man" 2701 is added to the object of the "Girl", and a "Girl" 2702 is added to the object of the "Man."

In addition, in this embodiment, Park and School as the location name text string, Girl and Man as the subject noun text string, "makes a fuss", "jumps", sits on, goes close to, stands up, and says as the verb text string, and happily and sadly as the expression name text string, have been used, but the present invention is not limited thereto. In particular, although the examples of the subject noun text string are general nouns, proper nouns may be used by giving a name of a proper noun for character data which a user desires to use frequently (e.g., assign Ai to Girl), and storing.

In addition, in this embodiment, the character adjective text string 603 and the object adjective text string 804 may be shown by displaying before displaying character data and object data and at the time of displaying the same, respectively, so that the differences among these data are easy to understand, or a further search (filtering) of character data and object data may be carried out by displaying them in a list inside or beside the subject input section 1403 and the object input section 1405, respectively.

Moreover, in this embodiment, the text string/character correspondence table 118, the character/action correspondence table 120, and the text string/set correspondence table 122 can be placed on the servers 108 to 114 of Internet 107 to share among one or more users. Moreover, not only a lot of material data can be used, but also the latest material data created by other users and the like can be used.

Moreover, the subject noun text string 601 of the text string/character correspondence table 118, the verb text string 702 and the expression name text string 703 of the character/action correspondence table 120, the location name text string 801 and the object name 803 of the text string/set correspondence table 122 may be described and stored in descending order of the number of selections of the text strings based on a history of the selection by a plurality of users so that the text string with high frequent use may be searched first. Moreover, in the same way, the link information 602 to character data of the text string/character correspondence table 118, the link information 704 to action data of the character/action correspondence table 120, and the link information 802 to set data of the text string/set correspondence table 122 may be described and stored in the order from the link information to frequently selected data, based on a history of selections by a plurality of users so that data with high frequent use may be displayed first.

Moreover, the action dictionary 124 may be accessed over Internet 107 to be shared by one or more users.

Figure 28:
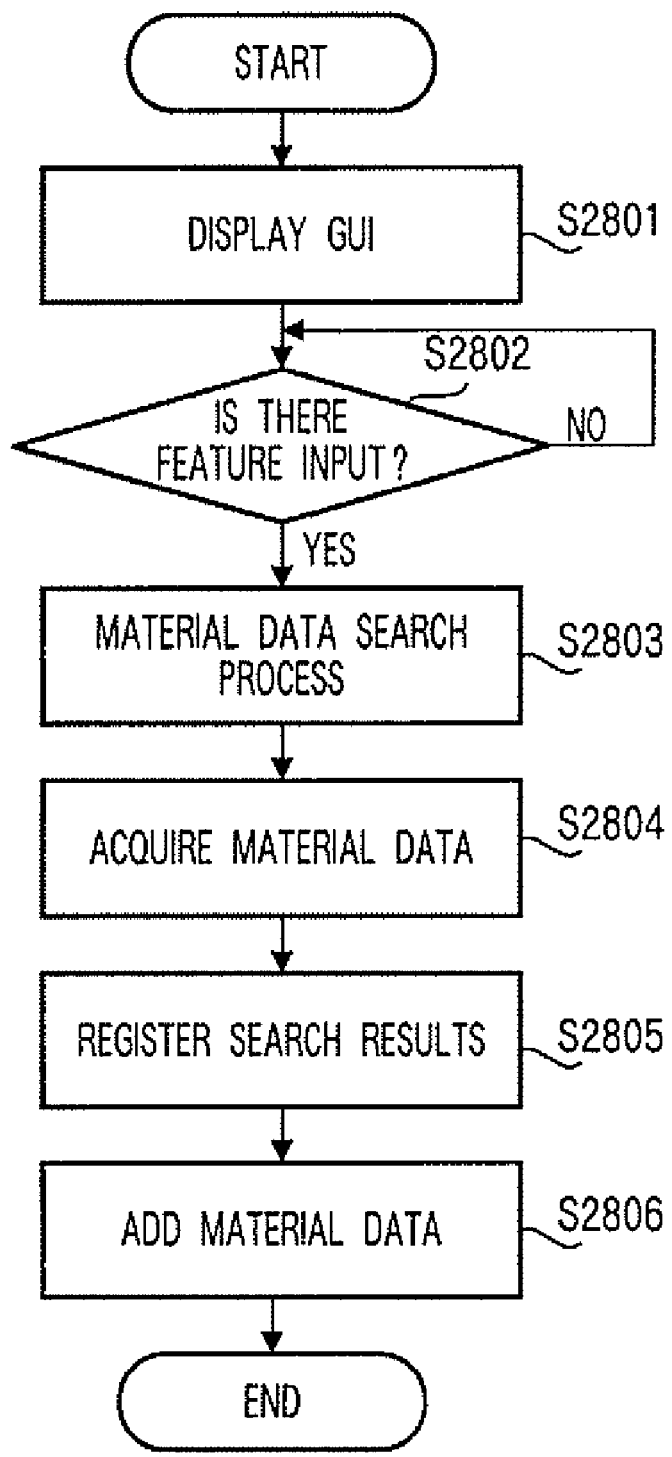
FIG. 28 is a flow chart of a search process of the image creating apparatus according to this embodiment.

Next, the search process (S1809, 2009, 2212 and 2409) of the image creating apparatus 100 according to this embodiment is described in detail using FIG. 28. FIG. 28 is a flow chart of the search process of the image creating apparatus 100 according to this embodiment.

In addition, practically, the image creating apparatus 100 carries out the search of set data 114 in S1809, the search of character data 112 in S2209, the search of action data 113, and the search of object data (set data 114) in S2409. However, in the following description, character data 112, action data 113, and set data 114 are described as material data.

First, the display control section 127 of the image creating apparatus 100 creates GUI 1500, which is a screen for searching material data, and displays this in the monitor 105 (S2801). Then, the image creating apparatus 100 moves to a mode in which material data is searched from the feature.

Next, the input control section 126 of the image creating apparatus 100 monitors whether the feature for the material is input from the feature input section 1502 (S2802), and if the feature is input, informs the search section 128 of this fact.

Moreover, in S2802, the image creating apparatus 100 refers to the hierarchical structural description 130 at the time when the feature was input to the feature input section 1502, and displays in the feature input section 1502 a list of terms or keys which partially matches with the input feature.

Then, the search section 128 carries out the search process of material data to the feature input in S2802 (S2803). In addition, the details of the process of S2803 will be described later.

Next, the registration section 129 of the image creating apparatus 100 acquires metadata corresponding to material data determined in S2803 from the metadata database 111. Next, the registration section 129 acquires material data (character data 112, action data 113 and set data 114) determined in S2803 from character database 108, action database 109, or the set database 110 (S2804) using the link information described in acquired metadata.

Next, the registration section 129 registers the content of metadata acquired in S2804, that is, the search result. Specifically, if metadata acquired in S2804 is related to the character, the registration section 129 adds the content of metadata to the text string/character correspondence table 118, and if metadata acquired in S2804 is related to the action, it adds the content of metadata to the character/action correspondence table 120, and if metadata acquired in S2804 is related to the set, it registers the content of metadata with the text string/set correspondence table 122 (S2805).

Accordingly, the search results can be reflected on the text string/character correspondence table 118, the character/action correspondence table 120, and the text string/set correspondence table 122. As a result, the information related to material data which a user searched once will be displayed hereafter in the GUI 1400 used for a scenario input. Accordingly, a user can use material data, which the user searched once, without searching again.

Next, the registration section 129 adds the acquired material data. Specifically, if acquired material data is character data 112, the registration section 129 stores acquired material data in character data storage section 115, and if acquired material data is action data 113, it stores acquired action data in the action data storage section 116, and if acquired material data is set data 114, it stores acquired material data in the set data storage section 117 (S2806).

Accordingly, it is not necessary to acquire material data, which was acquired once, via Internet 107 again. Searched material data is most likely to be used frequently by the user, and this advantage is therefore significant.

Figure 29:
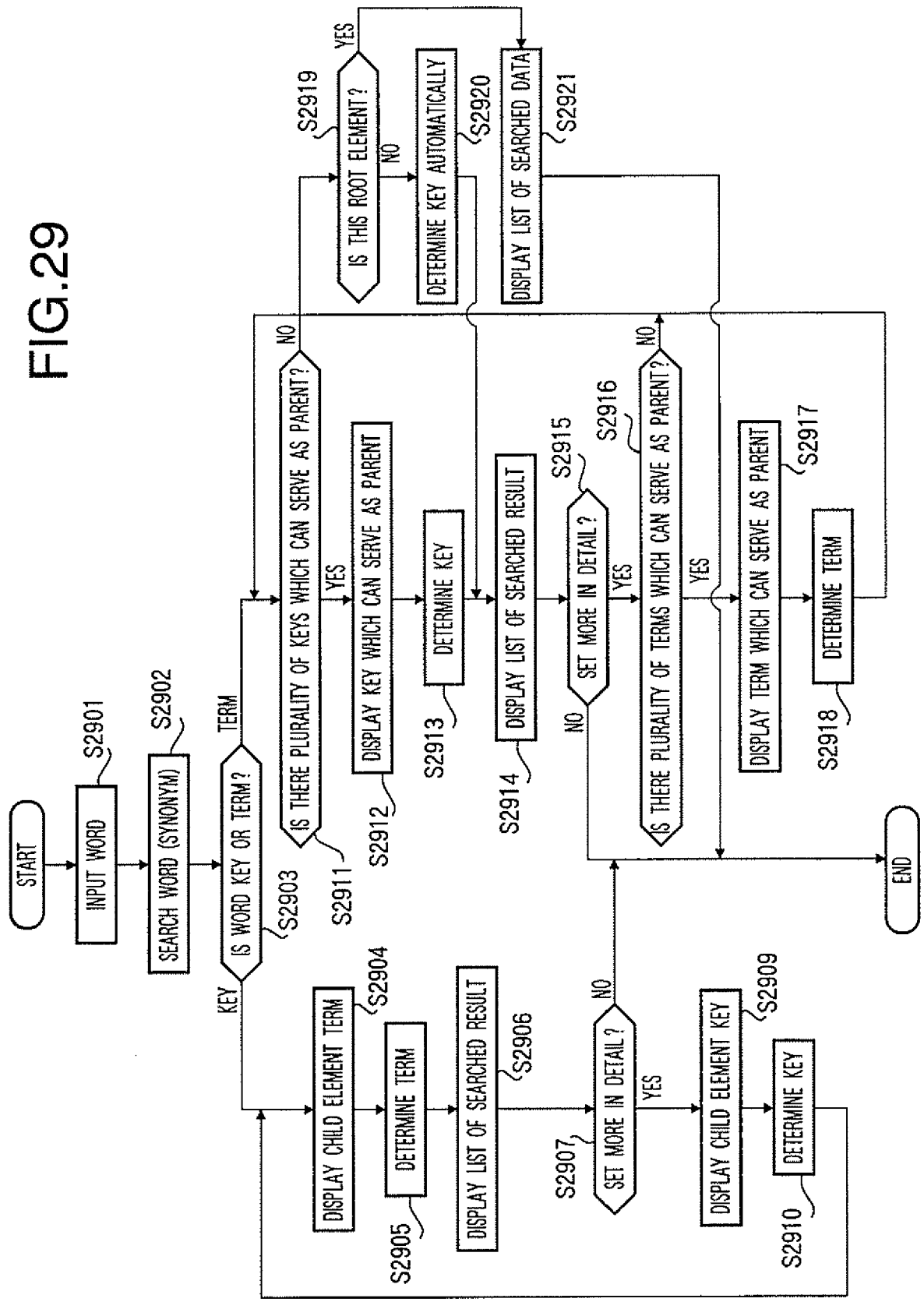
FIG. 29 is a flow chart of a process of searching for material data of the image creating apparatus according to this embodiment.

Next, the process of material data search process (S2803 in FIG. 28) of the image creating apparatus 100 is described in detail using FIG. 29. FIG. 29 is a flow chart of the process of material data search process of the image creating apparatus 100 according to this embodiment.

First, the search section 128 of the image creating apparatus 100 receives a feature (word) sent from the input control section 126 (S2901). Next, the search section 128 refers to the hierarchical structural description 130 and searches for the feature (word) input in S2901 or a synonym for the feature (S2902).

Next, the search section 128 determines whether the word searched in S2902 is the word related to a key or the word related to a term (S2903).

In S2903, if it is determined that the searched word is a key, the search section 128 refers to the hierarchical structural description 130, searches a child element term of the word (key) searched in S2902, and sends a list of the searched terms to the display control section 127. Then, the display control section 127 displays a list of the sent terms in the feature display section 1503 of GUI 1500 (S2904).

In addition, in S2904, the number of terms to display may be set to a desired number of the user or the like. In this case, regarding the term to display, various application examples such as giving priority to those with a history of frequent use by the user, or listing in an alphabetic order, or giving priority to those with a high priority given to a term in advance, can be conceived. As a result, a user can decrease the number of the choices, and therefore, the search efficiency can be increased.

Next, the input control section 126 monitors whether a user selected a desired term from a list of the terms displayed in the feature display section 1503, and if a desired term was selected, the selected term is sent to the search section 128. Then, the search section 128 determines the sent term (S2905).

Next, the search section 128 refers to the metadata database 111 and searches for metadata corresponding to the determined term. Next, the search section 128 sends searched metadata to the text string/CG conversion storage section 131, and the text string/CG conversion storage section 131 acquires thumbnails of the determined term using the sent metadata, and sends a list of the acquired thumbnails (search results) to the display control section 127. Then, the display control section 127 displays a list of the thumbnails in the thumbnail display section 1505 of GUI 1500 (S2906).

Accordingly, a user can visually recognize the outline of material data for the determined term by seeing the thumbnails.

Next, the image creating apparatus 100 determines whether there is an input for setting the search conditions (key) more in detail by a user, in the input control section 126, that is, an input for carrying out a more detailed search using a lower level concept (S2907).

Then, if it is determined that the search further in detail will not be carried out in S2907, that is, if thumbnail was selected from a list of the thumbnails displayed in S2906, the process ends.

On the other hand, in S2907, if it is determined to set further in detail and search for, the search section 128 refers to the hierarchical structural description 130, searches for keys which are child elements of the term determined in S2905, and sends a list of the searched keys to the display control section 127. Then, the display control section 127 displays a list of the sent keys in the feature display section 1504 of GUI 1500 (S2909).

Next, the input control section 126 monitors whether the user selected a desired key from a list of the keys displayed in the feature display section 1504, and if the desired key was selected, the selected key is sent to the search section 128. Then, the search section 128 determines the sent key (S2910).

Then, in S2910, the search section 128 carries out the processes from S2904 onward to the determined key, and determines material data for the material of the scenario.

Figure 30:
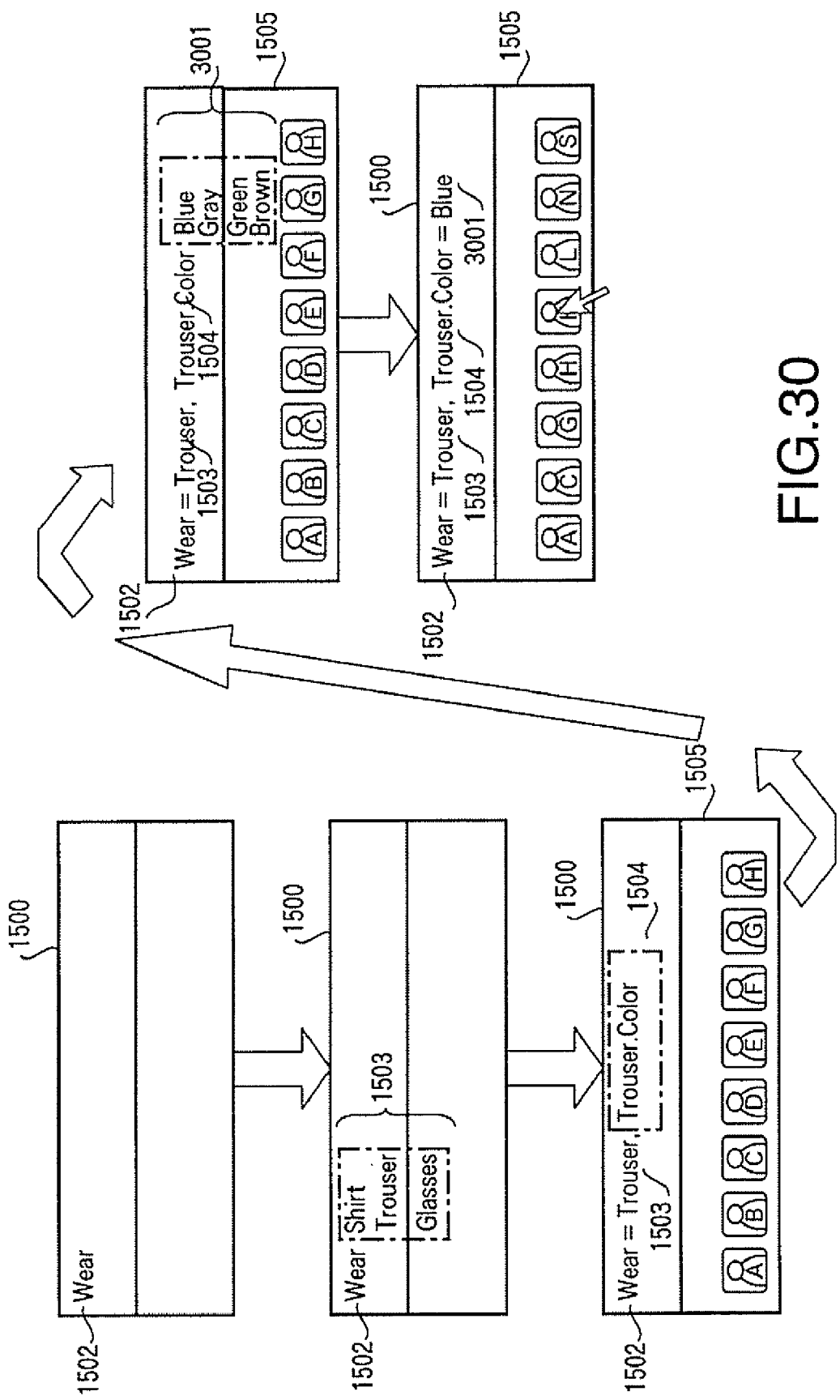
FIG. 30 is a first view for explaining a process of searching for material data of the image creating apparatus according to this embodiment.

For example, as shown with FIG. 30, if a key "Wear" is input to the feature input section 1502 (S2901), the image creating apparatus 100 searches for, from the hierarchical structural description 130, "Shirt," "Trouser," and "Glasses" which are the terms of the child element of the key "Wear," and displays them in the feature display section 1503 (S2902 to S2904).

Next, if a user selects the "Trouser" from the feature display section 1503, the image creating apparatus 100 determines the "Trouser" (S2905), and displays thumbnails of material data for the "Trouser" in the thumbnail display 1505 (S2906).

Next, if a user determines that there is a large number of the displayed thumbnails, and also carries out an input of searching further in detail (S2907), the image creating apparatus 100 searches for, from the hierarchical structural description 130, "Trouser.Color" and "Trouser.Length" which are the keys of the child element of the "Trouser", and displays them in the feature display section 1504 (S2908).

Next, if a user selects the "Trouser.Color", the image creating apparatus 100 determines the "Trouser.Color" (S2910), refers to the hierarchical structural description 130, searches for "Blue," "Gray," "Green," and "Brown," which are the terms of the child element of the "Trouser.Color," and displays them in the feature display section 3001 (S2904).

Next, if a user selected the "Blue" from the feature display section 1503, the image creating apparatus 100 determines the "Blue" (S2905), and displays thumbnails of material data for the "Blue" in the thumbnail display section 1505 (S2906). Then, a user selects a desired thumbnail from the displayed thumbnails to thereby select material data for this thumbnail.

In this way, when the feature for the material of scenario was input with a key, the image creating apparatus 100 searches for material data for the input key and the term corresponding thereto.

Moreover, if corresponding material data is too large in the search using a firstly input key, the search range can be narrowed down using lower level keys to thereby carry out the search. Accordingly, a user can search for desired material data from an adequate number of candidates of material data.

That is, material data can be searched by narrowing down the search range from the features of a higher level concept to the features of a lower level concept, in other words, from the general features to the specific features.

On the other hand, if it is determined that the searched word is a term in S2903, the search section 128 refers to the hierarchical structural description 130, searches for a key which is the parent element of the word (term) searched in S2902, and determines whether there are a plurality of searched keys (S2911). Then, if it is determined that there are a plurality of keys which can serve as the parent element in S2911, this list of keys is sent to the display control section 127. Then, the display control section 127 displays a list of the sent keys in the feature display section 1503 of GUI 1500 (S2912).

In addition, in S2912, the number of keys to display may be set to a desired number of the user or the like. In this case, regarding the key to display, various application examples such as giving priority to those with a history of frequent utilization by the user, or listing in an alphabetic order, or giving priority to those with a high priority given to the key in advance, can be conceived.

Next, the input control section 126 monitors whether the user selected a desired key from a list of the keys displayed in the feature display section 1503, and if the desired key was selected, the selected key is sent to the search section 128. Then, the search section 128 determines the sent key (S2913).

Next, the search section 128 sends the key determined in S2913 and the term input in S2901 to the search section 128, and the search section 128 refers to the metadata database 111 and searches for metadata corresponding to the determined key and term. Next, the search section 128 sends searched metadata to the text string/CG conversion storage section 131, and the text string/CG conversion storage section 131 acquires thumbnails of the determined key and term using sent metadata, and sends a list of the acquired thumbnails (search results) to the display control section 127. Then, the display control section 127 displays a list of the thumbnails in the thumbnail display section 1505 of GUI 1500 (S2914).

Accordingly, a user can visually recognize the outline of material data for the determined key and term by seeing the thumbnails.

Next, the image creating apparatus 100 determines whether there is an input for setting the search conditions (term) more in detail by the user in the input control section 126, that is, an input for carrying out a search using a higher level concept (S2915).

Then, if it is determined that a search in any more detail will not be carried out in S2915, the process ends.

On the other hand, if it is determined to set further in detail and search in S2915, the search section 128 refers to the hierarchical structural description 130, searches a term which can serve as the parent element of the key determined in S2913, and determines whether there are a plurality of the searched terms.

If it is determined that there are a plurality of terms in S2916, it is necessary to have a user select either one of the terms, and therefore, a list of the searched terms is sent to the display control section 127. Then, the display control section 127 displays a list of the sent terms in the feature display section 1504 of GUI 1500 (S2917).

Next, the input control section 126 monitors whether the user selected a desired term from a list of the terms displayed in the feature display section 1504, and if a desired term was selected, the selected term is sent to the search section 128. Then, the search section 128 determines the sent term (S2918).

Then, the search section 128 carries out the processes from S2911 onward to the term determined in S2918.

On the other hand, if it is determined that there are not a plurality of terms in S2916, it is not necessary to have a user select a term, and therefore, the processes from S2911 onward are carried out to this term. Then, in S2910, the search section 128 carries out the processes from S2904 onward to the determined key, and determines material data for the material of scenario.

Moreover, in S2911, if it is determined that there are not a plurality of keys which can serve as the parent element, the search section 128 determines whether this key is a root element, that is, whether it is the highest level key (S2919).

Then, if it is determined that this key is the Root element in S2919, the key of this parent element is nothing but the Root element, and therefore, the search section 128 moves to a process of S2921, while if this key is not the Root element, it is automatically determined that this key was selected, and the flow moves to the process of S2914 (S2920).

Next, the search section 128 sends the key determined in S2919 and the key determined in S2911 or in S2913 to the search section 128, and the search section 128 refers to the metadata database 105 and searches metadata corresponding to the determined key and term, Next, the search section 128 sends searched metadata to the text string/CG conversion storage section 131, and the text string/CG conversion storage section 131 sends a list of thumbnails acquired from the link information in the sent search result (search result) to the display control section 127. Then, the display control section 127 displays a list of the thumbnails in the thumbnail display section 605 of GUI 600 (S2921).

Next, the image creating apparatus 100 waits for either thumbnail from a list of the thumbnails displayed in S2921 to be selected, and if selected, material data corresponding to the selected thumbnail is determined and the process ends.

Figure 31:
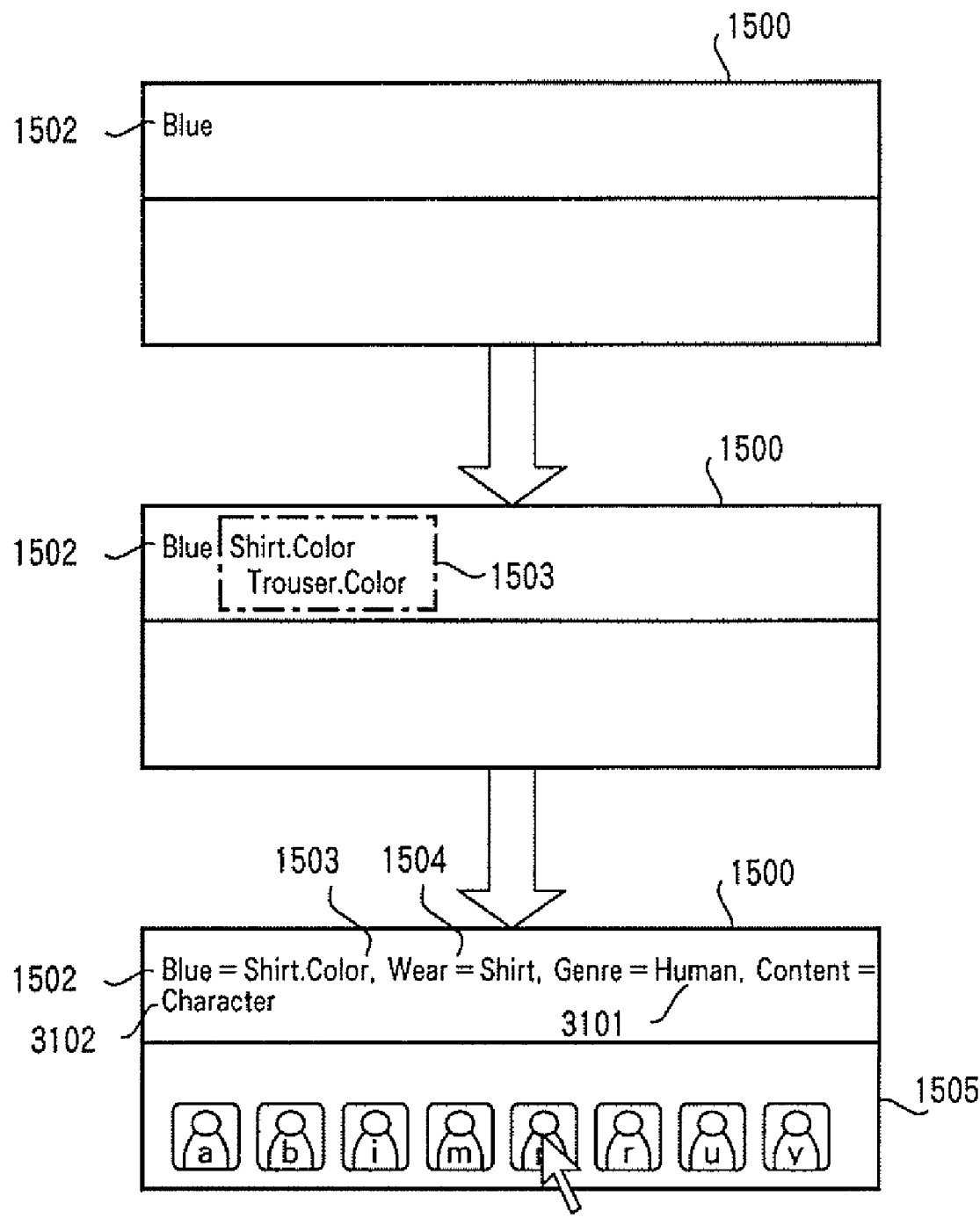
FIG. 31 is a second view for explaining the process of searching for material data of the image creating apparatus according to this embodiment.

For example, as shown in FIG. 31, if a key "Blue" is input to the feature input section 1502 (S2901), the image creating apparatus 100 searches, from the hierarchical structural description 130, "Shirt.Color" and "Trouser.Color" which are the keys of the parent element of the term "Blue", and displays them in the feature display section 1503 (S2901 to S2903, S2911 and S2912).

Next, the image creating apparatus 100 displays the thumbnail corresponding to the "Shirt.Color" selected by the user in the thumbnail display section 1505 (S2913 and S2914).

Moreover, if a user attempts to carry out a search using "Shirt" which is a higher level term of the "Shirt.Color," the image creating apparatus 100 displays the "Shirt," and "Wear" which is the key of the parent element of the "Shirt," in the feature display section 1504, and displays the thumbnails for the "Shirt" and "Wear" which are to be selected by the user (S2915, S2916 and S2911 to S2914).

Moreover, if a user attempts to carry out a search using "Human" which is a higher level term of the "Wear," the image creating apparatus 100 displays the "Human," and "Genre" which is the key of the parent element of the "Human," in the feature display section 3101, and displays the thumbnails for the "Human" and "Genre" which are to be selected by a user (S2915, S2916 and S2911 to S2914).

Moreover, if a user attempts to carry out a search using "Character" which is a high level term of the "Genre," the image creating apparatus 100 displays a key "Content" which is the parent element of the "Character" and "Character," in the feature display section 3102 and displays the thumbnails for the "Character" and "Content," which are to be selected by the user (S2915, S2916, S2911, S2919 and S2921).

In this way, in the image creating apparatus 100, if a feature for the material of scenario is input as a term, material data is searched using a set of the term and the parent element key having the input term.

Moreover, in a search using a firstly input term and the parent element key, if corresponding material data is too small, the search range can be expanded and searched by using the higher level term and the parent element key thereof. Accordingly, a user can search for desired material data from an adequate number of candidates of material data.

That is, material data can be searched by expanding the search range from the features of a lower level concept to the features of a higher level concept, in other words, from the specific features to the general features.

As described above, material data can be searched while carrying out the computer graphics creation process, and by using searched material data, the creation process of computer graphics can be carried out. In this way, the computer graphics creation process and the search process of material data can be carried out through a series of operations. As a result, higher speed and higher reliability in the computer graphics creation process can be attained.

Moreover, just by inputting the feature which came into a user's head, material data corresponding to the feature can be searched. Accordingly, even if a user does not know the name of material data, desired material data can be searched readily.

As described above, according to this embodiment, a user can create a scenario of computer graphics while confirming material data which the system has. Moreover, a process of creating computer graphics from a scenario input and a process of newly searching for material data can be carried out through a series of operations. Moreover, by registering newly searched material data, searched material data can be used readily hereafter.

In addition, a configuration, in which the processes carried out by the image creating apparatus 100 are programmed to cause a general-purpose computer to execute, may be possible.

Moreover, although in the embodiment, a configuration has been described, in which a process of creating computer graphics from a scenario input, and a process of newly searching for material data, a process of registering newly searched material data are carried out through a series of operations, a configuration may be possible, in which the process of creating computer graphics from a scenario input, and the process of newly searching for material data, the process of registering newly searched material data are carried out in different systems, respectively.

The present specification is based on Japanese Patent Application No. 2004-018839 filed on Jan. 27, 2004, Japanese Patent Application No. 2004-029599 filed on Feb. 5, 2004, and Japanese Patent Application No. 2005-17468 filed on Jan. 25, 2005, the entire content of which is expressly incorporated by reference herein.

INDUSTRIAL APPLICABILITY

The present invention can be used not only in apparatus for creating images but also in broader fields, such as communication apparatus like a cellular phone for transmitting to other users desired messages and information using computer graphics.

The invention claimed is:

1. An image creating apparatus for creating computer graphics of an animation from text, comprising:
   an inputter that inputs various information including a text string;
   a displayer that displays various information;
   a material data storage that stores, as material data, character data, action data and set data for creating the computer graphics;
   a correspondence table storage that stores a text string/ material correspondence table that associates the material data with text strings that show material names for the material data;
   a searcher that, when a partial text string that designates a feature of the material data is inputted from the inputter, newly searches for material data corresponding to the input feature, using a database located outside the image creating apparatus that stores the material data, and a hierarchical structural description that describes the feature of the material data in a hierarchical structure;
   a registrationer that stores the newly searched material data in the material data storage and registers a correspondence of the newly searched material data and a material name of the newly searched material data in the text string/material correspondence table; and a text string/CG conversion processor that, when a text string that designates a material name is inputted by the inputter, refers to the text string/material correspondence table, searches for a material name with which the input text string partially matches, acquires material data corresponding to the searched material name, and creates the computer graphics of the animation using the acquired material data.

2. The image creating apparatus according to claim 1, wherein, when the feature of the material data is inputted, the searcher refers to the hierarchical structural description, searches for a feature of a lower hierarchy than the input feature, and searches for material data corresponding to the searched feature of the lower hierarchy.

3. The image creating apparatus according to claim 1, wherein, when the feature of the material data is inputted, the searcher refers to the hierarchical structural description, searches for a feature of a higher hierarchy than the input feature, and searches for material data corresponding to the searched feature of the higher hierarchy.

4. The image creating apparatus according to claim 1, further comprising a display controller that displays a list of the feature of the material data in the displayer, and wherein, when a feature of the material data is selected from the list, the searcher searches for material data corresponding to the selected feature.

5. The image creating apparatus according to claim 4, wherein, when a feature of the material data is selected from the list, the display controller displays a list of thumbnails of material data corresponding to the selected feature.

6. The image creating apparatus according to claim 4, wherein the display controller displays a predetermined number of features on the displayer.

7. The image creating apparatus according to claim 1, wherein the feature of the material data is defined by an attribute and a value of the attribute.

8. The image creating apparatus according to claim 1, wherein:
the hierarchical structural description describes the feature related to the material data stored on a network;
the searcher searches for the material data stored on the network; and
the registrationer registers the searched material data stored on the network.

9. The image creating apparatus according to claim 1, wherein:
the material name is further associated with an expression adjective which indicates an expression;
the text string/CG conversion processor, when a text string that designates the expression adjective is inputted, searches for an expression adjective with which the input text string partially matches; and
the displayer displays the searched expression adjective.

10. The image creating apparatus according to claim 1, wherein:
the material name is further associated with an expression adverb which indicates an expression;
the text string/CG conversion processor, when a text string that designates the expression adverb is inputted, searches for an expression adverb with which the input text string partially matches; and
the displayer displays the searched expression adverb.

11. The image creating apparatus according to claim 1, wherein:
the material data comprises at least one of action data, character data and set data;
the material name includes an action name, a character name and a set name corresponding to the action data, the character data and the set data, respectively; and
the text string/material correspondence table comprises a text string/action correspondence table, a text string/character correspondence table and a text string/set correspondence table corresponding to the action data, the character data and the set data, respectively.

12. The image creating apparatus according to claim 11, wherein:
the action name is associated with the character data; and
the text string/CG conversion processor, when the character data is selected as the material data, searches for an action name corresponding to the selected character data.

13. The image creating apparatus according to claim 11, wherein:
the action data comprises an object; and
the text string/CG conversion processor, when a set name to indicate a possible object which the action data can comprise is inputted, acquires set data corresponding to the input set name and creates the computer graphics using the acquired set data.

14. The image creating apparatus according to claim 13, wherein the text string/CG conversion processor, when a text string that designates a set name to indicate a possible object which the action name can comprise is inputted, refers to the text string/set correspondence table and searches for a set name with which the input text partially matches.

15. An image creating method performed by an image creating apparatus for creating computer graphics of an animation from text, the method comprising:
storing, as material data, character data, action data and set data for creating the computer graphics by a first storage of the image creating apparatus;
storing a text string/material correspondence table that associates the material data with text strings that show material names for the material data by a second storage of the image creating apparatus;
newly searching, when a partial text string that designates a feature of the material data is input, for material data corresponding to the input feature using a database located outside the image creating apparatus that stores the material data, and a hierarchical structural description that describes the feature of the material data in a hierarchical structure, by a searcher of the image creating apparatus;
storing the newly searched material data in the first storage, and registering a correspondence of the newly searched material data and a material name of the newly searched material data in the text string/material correspondence table stored by the second storage, by a registrationer of the image creating apparatus; and
referring to the text string/material correspondence table when a text string that designates a material name is inputted, searching for a material name with which the input text string partially matches, acquiring material data corresponding to the searched material name, and creating the computer graphics of the animation using the acquired material data, by a processor of the image creating apparatus.

* * * * *